(12) United States Patent
Sakurada et al.

(10) Patent No.: US 7,029,807 B2
(45) Date of Patent: Apr. 18, 2006

(54) COLOR FILTER, METHOD FOR PRODUCING THE SAME, DISPLAY APPARATUS, AND ELECTRONIC DEVICE THEREWITH

(75) Inventors: Kazuaki Sakurada, Suwa (JP); Tomomi Kawase, Matsumoto (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/717,999

(22) Filed: Nov. 20, 2003

(65) Prior Publication Data
US 2004/0146791 A1 Jul. 29, 2004

(30) Foreign Application Priority Data
Nov. 22, 2002 (JP) ............................. 2002-339297
Aug. 25, 2003 (JP) ............................. 2003-300144

(51) Int. Cl.
G02B 5/20 (2006.01)
G02F 1/1335 (2006.01)

(52) U.S. Cl. ..................... 430/7; 349/106; 349/114
(58) Field of Classification Search ................ 430/7; 349/106, 113, 114
See application file for complete search history.

(56) References Cited

U.S. PATENT DOCUMENTS 6,022,647 A * 2/2000 Hirose et al. ................ 430/7
6,630,274 B1 10/2003 Kiguchi et al.
6,704,075 B1 3/2004 Takizawa et al.
6,801,278 B1 10/2004 Tanada et al.
2002/0101552 A1 * 8/2002 Yi et al. ..................... 349/106

FOREIGN PATENT DOCUMENTS

| CN | 1291289 A | 4/2001 |
|---|---|---|
| CN | 1309319 A | 8/2001 |
| CN | 1348116 A | 5/2002 |
| JP | 8-146214 | 6/1996 |
| JP | 10-206623 | 8/1998 |
| JP | 2001-033778 | 2/2001 |
| JP | 2002-062525 | 2/2002 |
| JP | 2002-164635 | 6/2002 |

OTHER PUBLICATIONS

Chinese Office Action (& English translation) issued on Dec. 10, 2004, on the counterpart Chinese Patent Application No. 200310116192.4.
Communication from Korean Patent Office re: related application.

* cited by examiner

Primary Examiner—John A. McPherson
(74) Attorney, Agent, or Firm—Harness, Dickey & Pierce, P.L.C.

(57) ABSTRACT

A color filter having a colored portion placed in each of a plurality of areas on a substrate, wherein the plurality of areas each have a light reflecting areas in which light entering the colored portion is reflected, and a light transmitting areas through which light entering the colored portion passes, and the light transmitting areas includes a recessed portions for adjusting an optical path length in the colored portion.

13 Claims, 22 Drawing Sheets

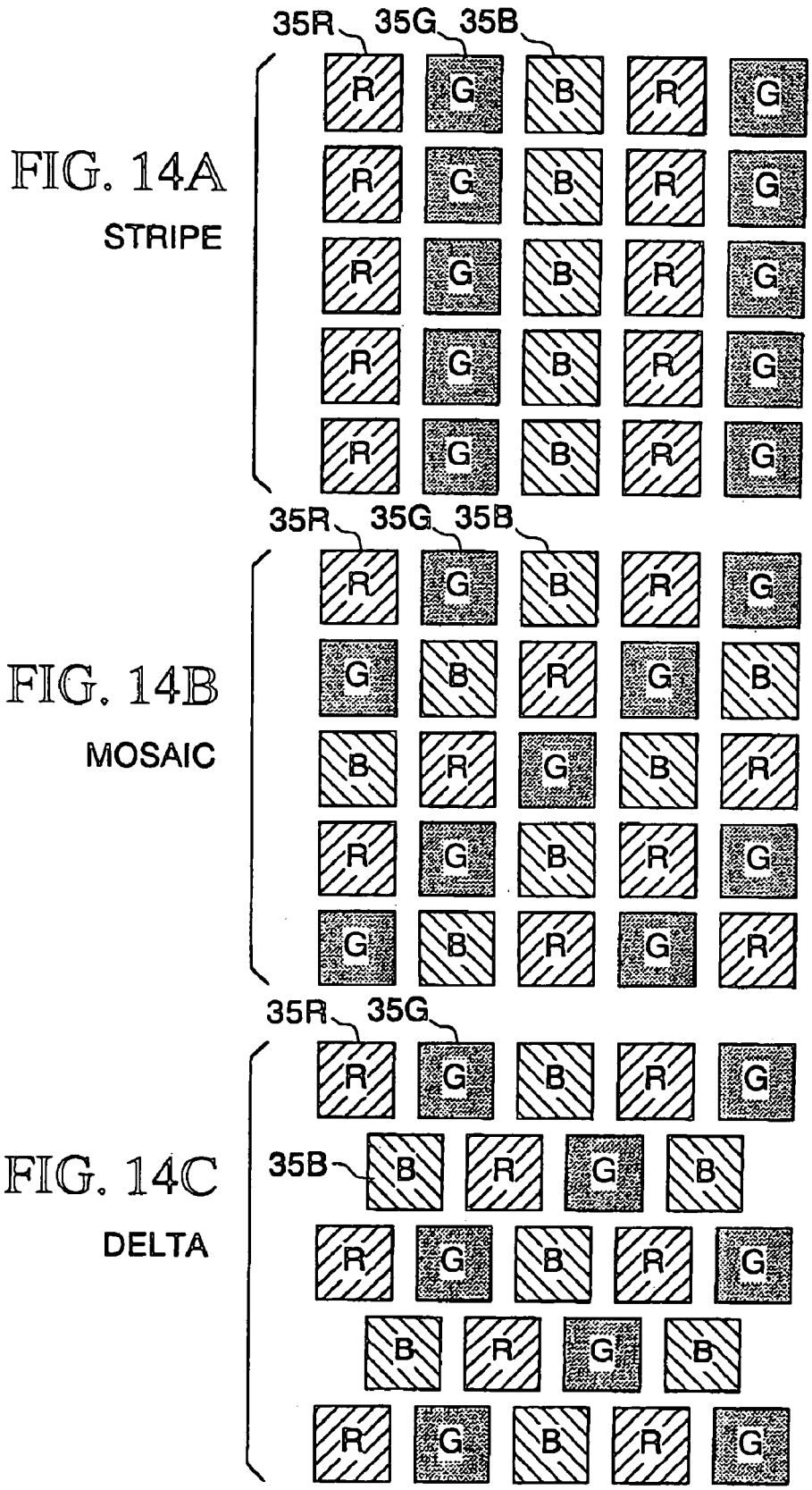
FIG. 14A STRIPE
FIG. 14B MOSAIC
FIG. 14C DELTA

COLOR FILTER, METHOD FOR PRODUCING THE SAME, DISPLAY APPARATUS, AND ELECTRONIC DEVICE THEREWITH

BACKGROUND OF THE INVENTION

1. Field of the Invention

The present invention relates to a color filter, a method for producing the same, a display apparatus, and an electronic device therewith.

This application claims priority on Japanese Patent Applications Nos. 2002-339297 and 2003-300144, the contents of which are incorporated herein by reference.

2. Description of Related Art

In recent years, liquid crystal apparatuses have been widely used as means for displaying information in electronic device such as laptop computers, cellular phones, and electronic notebooks. For such liquid crystal apparatuses, semi-transmitting and reflecting liquid apparatuses having advantages of both transmission liquid apparatuses providing display utilizing light from a built-in light source, and reflection providing display utilizing external light such as sunlight are known. The semi-transmitting and reflecting liquid apparatus enables the display to be viewed even in a dark environment, and also enables the display to be provided utilizing external light in bright environment, thus making it possible to reduce power consumption compared to the transmission liquid crystal apparatus in which a light source is lit all the time.

The semi-transmitting and reflecting liquid crystal apparatus is generally configured such that a semi-transmitting and reflecting layer is provided on the surface on the liquid crystal layer side of a substrate located on the side opposite to the visual viewing side, of a pair of substrates facing each other with a liquid crystal layer held therebetween. The semi-transmitting and reflecting layer is constituted by, for example, a reflection layer having an aperture having a slit-shape for each dot and in the semi-transmitting and reflecting layer having such a configuration, apertures serve as light transmission portions and other portions serve as light reflection portions. In addition, semi-transmitting and reflecting liquid crystal apparatuses having a color filter on one substrate to enable color display is also known. Hereinafter, a substrate having a color filter is referred to as a "color filter substrate".

Methods for producing the color filter substrate are classified into several types according to materials of colored portions and production processes, and an inkjet method of discharging a coloring ink from a discharge nozzle of an inkjet head to form a large number of colored portions on a substrate has been recently proposed.

FIG. 34 shows a color filter substrate produced by the inkjet method. This color filter substrate has on a substrate 900 black matrixes (blackout layers) 901, reflection layers 902 made of metal such as Al, bank portions 903, a colored portion 905R, a colored portion 905G of G (green), a colored portion 905B of B (blue), and an overcoat layer 908. Colored portions 905 are formed by discharging coloring inks as colored portion constituting materials by an inkjet head (not shown) and drying the coloring inks.

In addition, a light source is provided on the substrate 900 side, and this light source is lit, whereby source light 910 passes to the viewer's side through the substrate 900, colored portions 905 and an overcoat layer 908 to provide so-called display in transmission mode. In addition, external light 920 such as sunlight on the viewer's side passes through the overcoat layer 908 and colored portions 905, is reflected by the reflection layer 902, and further passes to the viewer's side through colored portions 905 and the overcoat layer 908 to provide so-called "display-in-reflection mode".

In the color filter substrate shown in FIG. 34, source light 910 passes through colored portions 905 only once, and is then emitted to the viewer's side when display is provided in transmission mode, while external light 920 passes through the color filter substrate twice, i.e., before and after it is reflected by the reflection layer 902, and is then emitted to the viewer's side. Thus, a problem arises in that the color of external light 920 passing through colored portions 905 becomes deeper than the color of sunlight 910, resulting in a dark display color, that is, display of colors of the same density cannot be obtained in transmitting and reflecting modes.

In addition, the conventional method for producing a color filter has a problem in that exposure processing and etching processing are each required to be carried out at least twice for forming the black matrix 901 and the bank portion 903, and thus the production process is likely to be complicated.

SUMMARY OF THE INVENTION

The present invention has been made in view of the situations described above, and an object thereof is to provide, at a low cost, a color filter adjusted so that display colors are identical in density in transmitting and reflecting modes.

Furthermore, an object of the present invention is to provide a method for producing a color filter capable of simplifying a production process.

Furthermore, an object of the present invention is to provide a display apparatus including the above color filter to improve visibility and electronic device including this display apparatus.

For achieving the objects described above, the present invention employs configurations described below.

The color filter of the present invention is a color filter including a substrate having a plurality of areas, each area having a colored portion thereon, wherein the plurality of areas each have a light reflecting area in which light entering the colored portion is reflected, and a light transmitting area through which light entering the colored portion passes, and the light transmitting area includes recessed portions for adjusting an optical path length in the colored portion.

Thus, according to the present invention, the plurality of areas each have the light reflecting area and the light transmitting area, thus making it possible to form a color filter compatible with a semi-transmitting and reflecting liquid crystal apparatus having so-called "transmitting and reflecting modes".

Here, the transmission mode is such that illumination light such as backlight impinges on one surface of the color filter, passes through the colored portion, and is thereby colored, and the colored illumination light is emitted from the other surface of the color filter, whereby an image is displayed on a display surface. In addition, the reflection mode is such that external light such as sunlight and indoor light impinges on the display surface side, and passes through the colored portion, and the external light is thereby colored, reflected by a reflecting surface, and emitted to the display surface side after passing again through the colored portion, whereby an image is displayed on a display surface.

In addition, according to the present invention, the optical path length of the light transmitting area can be set to a desired length by adjusting the depth of the recessed portion, thus making it possible to make a display color by transmitted light to have a desired density.

Here, the optical path length of the light transmitting area is an optical path length of illumination light passing through the colored portion in the transmission mode described above, and indicates a distance equivalent to the thickness of the colored portion in the light transmitting area.

Furthermore, according to the present invention, the recessed portion of the light transmitting area is filled with the colored portion, whereby the thickness of the color filter substrate can be reduced, thus making it possible to improve light transmittance.

In addition, the color filter is the aforesaid color filter, wherein the depth of the recessed portion is defined with respect to the reflection surface of the light reflecting area so that the light reflecting area and the light transmitting area have the same optical path length in the colored portion.

Here, the optical path length of the light reflecting area is an optical path length of external light passing through the colored portion in the reflection mode described above, and indicates a distance equivalent to a thickness twice as large as the thickness of the colored portion in the light reflecting area.

Therefore, according to the present invention, the optical path lengths of external light passing through the colored portion of the light reflecting area and illumination light passing through the colored portion of the light transmitting area can be made identical, and thus the densities of display color in transmitting and reflecting modes can be made identical.

In addition, the color filter of the present invention is the aforesaid color filter, wherein a ratio between the plane area of the light reflecting area and the plane area of the light transmitting area is set so that the ratio between light amounts of emitted light from the light reflecting area and emitted light from the light transmitting area is at a desired ratio.

Here, the ratio of the plane area refers to a ratio between the areas of the light reflecting area and the light transmitting area with the color filter viewed plane-wise from the display surface side.

Therefore, according to the present invention, the brightness of display color in transmitting and reflecting modes is adjusted by adjusting the ratio of the plane area, thus making it possible to form a color filter providing display in a desired way.

For example, when a liquid crystal apparatus for use in environments with lesser external light is formed, the area of the light transmitting area of the color filter is made larger than that of the light reflecting area, whereby a display apparatus making maximum use of illumination light such as backlight can be formed. In addition, when a liquid crystal apparatus of low power consumption utilizing external light is formed, the area of the light reflecting area of the color filter is made larger than that of the light transmitting area, whereby a display apparatus making maximum use of external light can be formed.

In addition, the color filter of the present invention is the aforesaid color filter, wherein the plurality of areas are partitioned by banks.

Therefore, according to the present invention, a coloring ink being a colored portion constituting material is discharged to each area partitioned by the bank by a droplet discharge process, whereby colored portions can be formed in the area. In addition, this area has the light transmitting area and the light reflecting area, and therefore, colored portions of the same color can be formed at one time in the light transmitting area and the light reflecting area.

Here, the droplet discharge process is such that droplets of the coloring ink are discharged from a droplet discharge head onto a substrate, and fixed. According to the droplet discharge process, droplets of the coloring ink can be discharged onto very small areas correctly, thus making it possible to fix a material ink directly on a desired colored area without performing photolithography. Therefore, the method is very reasonable in that waste of materials is avoided, and production costs can be reduced.

In addition, the color filter of the present invention is the aforesaid color filter, wherein the surface of the bank has liquid repellency.

Therefore, according to the present invention, the surface of the bank has liquid repellency, and thus even if a coloring ink is erroneously discharged onto the top surface, the coloring ink is disposed at a target area with no coloring ink remaining on the top surface, thus eliminating the possibility of color mixture between adjacent colored portions.

In addition, the color filter of the present invention is the aforesaid color filter, wherein the colored portion is formed by a droplet discharge process.

Therefore, according to the present invention, because formation of the colored portion by photolithography is not performed, waste of materials of coloring inks and production process is reduced, production is simplified, and thus production costs can be reduced.

In addition, the color filter of the present invention is the aforesaid color filter, wherein the reflection surface of the light reflecting area is composed of a metal including Al, Ag or the like, and has a light scattering capability.

Therefore, according to the present invention, external light incident from the display surface side is scatteringly reflected toward the display surface side, thus making it possible to provide a display apparatus having a large view angle with respect to the display surface, i.e., a wide view angle liquid crystal apparatus.

Next, the display apparatus of the present invention includes the aforesaid color filter.

Therefore, according to the present invention, the display apparatus includes a color filter having light reflecting areas and light transmitting areas, thus making it possible to provide a semi-transmission and refection liquid crystal apparatus having so-called "transmitting and reflecting modes".

In addition, the optical path length of the light transmitting area is set to a desired length by adjusting the depth of the recessed portion of the light transmitting area, thus making it possible to provide a display apparatus with the display color by transmitted light having a desired density.

In addition, the recessed portion of the light transmitting area is filled with the colored portion, and thus the thickness of the color filter substrate is reduced, thus making it possible to improve light transmittance of the display apparatus.

In addition, if the depth of the recessed portion is defined with respect to the reflection surface of the light reflecting area so that the light reflecting area and the light transmitting area has the same optical path length in the colored portion, external light passing through the colored portion of the light reflecting area can be made identical in optical path length to illumination light passing through the colored portion of the light transmitting area, thus making it possible to provide a display apparatus in which the densities of display color in transmitting and reflecting modes are the same.

In addition, if the ratio between the plane area of the light reflecting area and the plane area of the light transmitting area is set to a desired ratio so that light from the colored portion has a desired amount of light, the brightness of display color in transmitting and reflecting modes is adjusted, thus making it possible to provide a display apparatus providing display in a desired way.

Next, the electronic device of the present invention includes the aforesaid display apparatus.

Therefore, according to the present invention, a suitable semi-transmitting and reflecting liquid crystal apparatus in the density of display color in transmitting and reflecting modes is adjusted.

Next, the method for producing a color filter of the present invention is a method for producing a color filter with a colored portion placed in each of a plurality of areas on a substrate, wherein the plurality of areas each have a light reflecting area in which light entering the colored portion is reflected, and a light transmitting area in which light entering the colored portion passes, and recessed portions constituting light transmitting areas are formed.

Therefore, according to the present invention, a color filter having light reflecting areas and light transmitting areas can be produced, thus making it possible to form a color filter compatible with a semi-transmitting and reflecting liquid crystal apparatus having so-called "transmitting and reflecting modes".

In addition, the optical path length of the light transmitting area can be set to a desired length by adjusting the depth of the recessed portion, thus making it possible to form a color filter with the display color by transmitted light having a desired density.

In addition, the recessed portion of the light transmitting area is filled with the colored portion, and thus the thickness of the substrate of the color filter can be reduced, thereby making it possible to form a color filter having an improved light transmittance.

Here, methods for forming recessed portions include a method of gouging a substrate, and a method of forming raised portions on a substrate. According to the method of gouging a substrate, a step between the bottom of the gouged part and the substrate surface corresponds to the recessed portion. In addition, according to the method of forming raised portions on a substrate, a step between the top of the raised portion and the substrate surface corresponds to the recessed portion.

Furthermore, for the method of gouging a substrate, an etching method is suitably used. For etching, wet etching with an etching solution, or dry etching, such as reactive ion etching is employed. Among these, wet etching is especially preferable, and a hydrofluoric acid solution, hydrogen fluoride-ammonium fluoride mixture or the like may be used. In addition, a method other than etching such as sandblasting, dicing, or laser processing may be used.

In addition, for the method of forming raised portions on a substrate, a method in which a uniform film is formed on a substrate, followed by performing patterning by photolithography using a mask, a method in which a pattern is directly imaged by a droplet discharge process or the like, and the like are employed. For the method for forming a uniform film on a substrate, various kinds of methods such as a CVD method and sputtering method requiring a vacuum system, a spin coat method capable of forming a film under atmospheric pressure, a dip coat method, a slit coat method and the like are employed, and the latter uses no vacuum system, thus making it possible to form a film at a low cost. In addition, in the method using a droplet discharge process, the substrate surface is preferably subjected to a liquid repellency treatment and a lyophilicity treatment in advance.

In addition, the method for producing a color filter of the present invention is the aforesaid production method, wherein the depth of the recessed portion is defined with respect to the reflection surface of the light reflecting area so that the light reflecting area and the light transmitting area have the same optical path length in the colored portion, and the recessed portion is formed accordingly.

Therefore, according to the present invention, a color filter in which the optical path lengths of external light and illumination light passing through colored portions in the light reflecting area and the light transmitting area are the same, i.e., the densities of display color in transmitting and reflecting modes are the same, can be formed.

In addition, the method for producing a color filter of the present invention is the aforesaid production method, wherein a ratio between the plane area of the light reflecting area and the plane area of the light transmitting area is set so that the ratio between the light amounts of emitted light from the light reflecting area and emitted light from the light transmitting area is a desired ratio, and the light reflecting area and the light transmitting area are formed accordingly.

Therefore, according to the present invention, the brightness of display color in transmission and refection modes is adjusted by adjusting the ratio of the plane area, thus making it possible to form a color filter providing display in a desired way.

In addition, the method for producing a color filter of the present invention is the aforesaid production method, wherein recessed portions and light reflecting areas are formed in one operation by an etching method.

Here, the light reflecting area is formed in a desired pattern by photolithography and the etching method after a thin film of metal Al or the like is formed on one surface of a substrate by a sputtering method or the like. The light reflecting area having irregularities formed on the surface, causing light to be scatteringly reflected, may also be formed by previously forming a resin film having irregularities on the surface, and then forming a thin film of metal Al or the like.

Therefore, according to the present invention, recessed portions constituting light transmitting areas and light reflecting areas are formed in one operation by etching, thus making it possible to simplify production processes.

In addition, the method for producing a color filter of the present invention is the aforesaid production method, wherein colored portions are formed by a droplet discharge process.

Here, the colored portion is formed in an area partitioned by the bank, and this area has a light transmitting area and a light reflecting area. In addition, the surface of the bank preferably has liquid repellency.

Therefore, according to the present invention, the colored portion can be formed by discharging a coloring ink being a colored portion constituting material by the droplet discharge process. In addition, colored portions of the same color can be formed in the light transmitting area and the light reflecting area at one time.

Furthermore, because formation of the colored portion by photolithography is not performed, waste of materials of coloring inks and production process is reduced, production is simplified, and thus production costs can be reduced.

BRIEF DESCRIPTION OF THE DRAWINGS

FIGS. 14A through 14C are schematic plan views showing a layout of colored portions of the color filter;

DETAILED DESCRIPTION OF THE INVENTION

Figure 1:
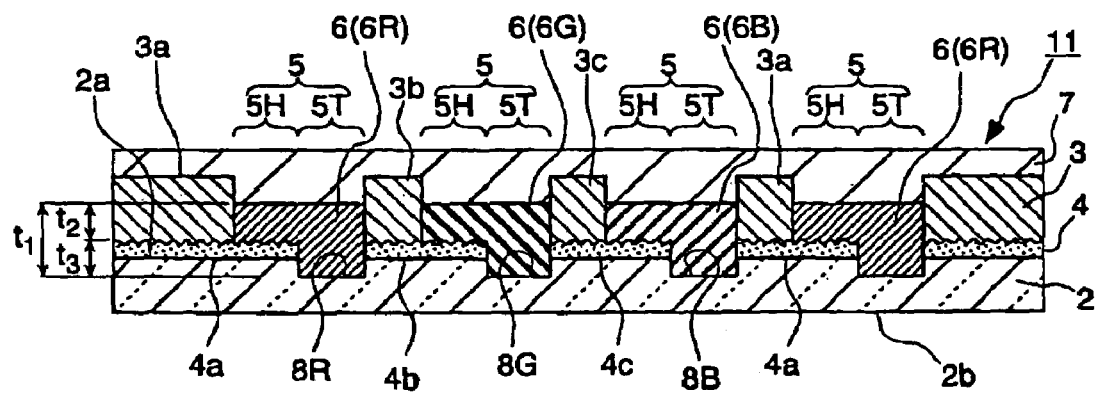
FIG. 1 is a sectional view of a color filter of the first embodiment of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Embodiments of the present invention will be described below with reference to the drawings. Furthermore, in FIGS. 1 to 21, layers and members are given scales different from actual scales so that the layers and members have sizes large enough to be visible in the drawings.

First Embodiment

Figure 2:
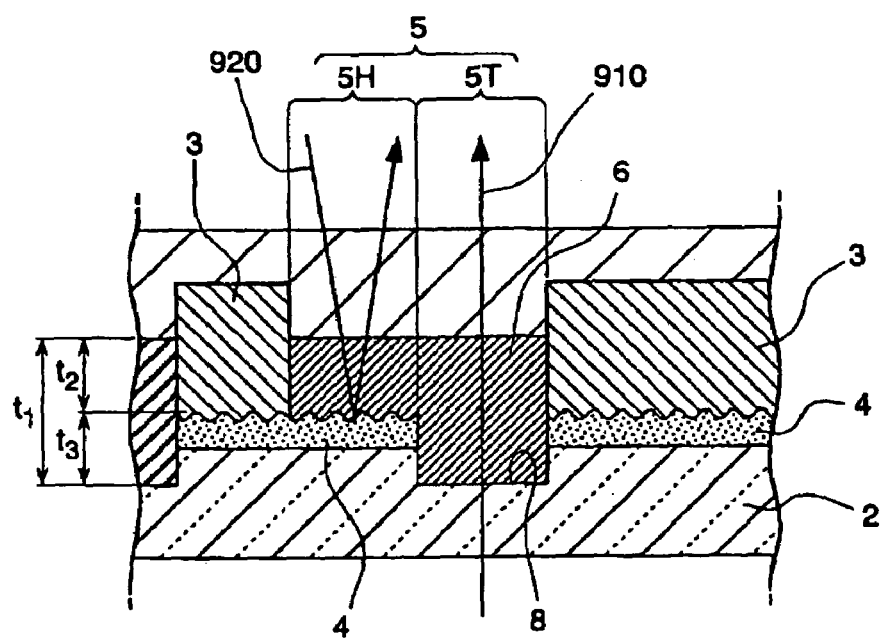
FIG. 2 is a sectional view showing essential parts of FIG. 1.

A color filter and a method for producing the same, which are the first embodiment of the present invention, will be described below with reference to the drawings. FIGS. 1 and 2 sectional views showing one example of the color filter of the first embodiment of the present invention, and FIG. 2 is a sectional view showing essential parts of FIG. 1.

Figure 22:
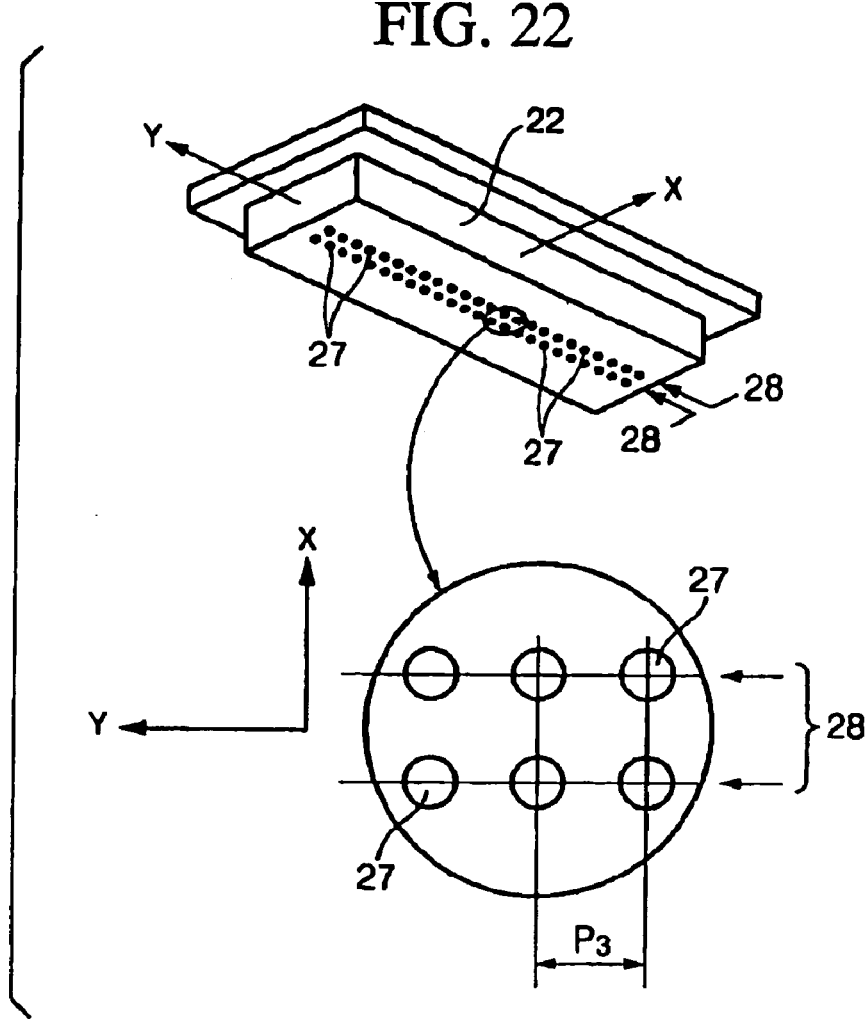
FIG. 22 is an enlarged perspective view of the inkjet head for use in the color filter producing apparatus.

In FIGS. 1 and 2, parts identical to elements of FIG. 22 are given like symbols.

As shown in FIG. 1, a color filter 11 of this embodiment includes a substrate 2, banks 3 formed on one surface 2a of the substrate, reflection layers (reflection surfaces) 4, an overcoat layer 7 covering colored portions 6, and a plurality of recessed portions 8 formed on one surface 2a of the substrate 2 in a predetermined pattern. Colored portions 6 are formed by discharging a coloring ink onto areas 5 provided over the substrate 2, banks 3 and reflection layers 4, and drying the coloring ink.

Each of areas 5 has a light transmitting areas 5T in which light incident from the side 2b of the substrate 2 in FIG. 1 passes through the recessed portions 8 and then through the colored portion 6, and a light reflecting areas 5H in which light entering the colored portion 6 from the overcoat layer 7 side in FIG. 1 is reflected by the reflection layer 4. The light transmitting areas 5T in the colored portion 6 has the optical path length set to a predetermined length by gauging the recessed portions 8 with the depth thereof being adjusted, and here it is preferable that, as shown in FIG. 1, by adjusting the depth t3 of the recessed portions 8 so that the thickness t1 of the colored portion 6 in the light transmitting areas 5T is twice as large as the thickness t2 of the colored portion 6 in the light reflecting areas 5H, the light transmitting areas 5T and the light reflecting areas 5H are made to have the same optical path length in the colored portion 6.

The substrate 2 is a transparent substrate made of glass, plastic film or the like, which is preferably a suitable material excellent in processability of the recessed portions 8, and not susceptible to degeneration and deterioration associated with formation of recessed portions.

The reflection layer 4 is a light scattering film scatteringly reflecting light incident through the light reflecting areas 5H, which is formed in a desired pattern by photolithography and an etching method after forming on the substrate 2 a resin film having irregularities on the surface in advance, and then forming a thin film such as metal Al on one surface of the substrate by a spattering method. Consequently, the reflection layer 4 has an irregular surface formed along a surface shape of the resin film.

The bank 3 is formed between adjacent recessed portions 8, whereby it is formed at least in an area surrounding each recessed portions 8 and in FIG. 1, it is formed on the top surface of the reflection layer 4. The bank 3 is composed of a transparent photosensitive resin film, and at least the top surface thereof has ink repellency. The transparent photosensitive resin film at least includes, for example, a fluororesin such as hexafluoro propylene causing the resin film to exhibit ink repellency, and a positive or negative photosensitive resin that is used in a usual photoresist, and is preferably excellent in optical transparency in the visible light range. The thickness of the bank 3 is preferably in the range of 0.5 to 2 μm, for example. In addition, the area 5 is partitioned by the bank 3.

In the area 5, the colored portion 6 is formed. As already described, the colored portion 6 is formed by discharging a coloring ink into the area 5 and drying the ink.

The colored portion 6 includes a red colored portion 6R, a green colored portion 6G and a blue colored portion 6B corresponding to three primary colors of R (red), G (green) and B (blue). The colored portion 6 is composed of an acryl resin, polyurethane resin or the like colored by an inorganic or organic pigment.

As shown in FIG. 1, the thickness of the colored portion 6 is set so that the thickness t1 of the colored portion 6 of the light transmitting areas 5T is twice as large as the thickness t2 of the colored portion 6 of the light reflecting areas 5H.

The colored portion 6 is formed in the area 5 constituted by the recessed portions 8, the bank 3 and the reflection layer 4 by an inkjet process (droplet discharge process), whereby at least one part thereof is buried in the substrate 2. In particular, in the color filter 11 shown in FIG. 1, the total thickness of pixel areas is reduced by etching the substrate 2 for t3 minutes, and thus the light transmittance of the color filter 11 can be improved. In addition, the surface of the bank 3 has ink repellency, and therefore when a coloring ink is discharged to form the colored portion 6, there is no possibility that the discharged coloring ink spreads outside the area 5, and adjacent colored portions 6 contact one another to cause color mixture.

Particularly, the top surface of the bank 3 has ink repellency, and therefore even if a coloring ink is erroneously discharged onto the top surface of the bank 3, the coloring ink is put in the target area 5 with no coloring ink remaining on the top surface, thus eliminating the possibility of color mixture between adjacent colored portions 6.

The overcoat layer 7 protects the colored portion 6 and flattens the surface of the color filter 11, and is composed of a transparent resin such as an acryl resin or epoxy resin. Furthermore, a transparent electrode film composed of an ITO film (indium-tin oxide film) and an orientation film may be provided on the overcoat layer 7 of the color filter 11.

In the color filter 11 configured in this way, a light source (not shown) is lit from the other surface 2b of the substrate 2, whereby source light 910 passes through the substrate 2 and then through the colored portion 6 of the light transmitting areas 5T and is thereby colored, then passes through the overcoat layer 7, and exits the color filter 11. In addition, external light 920 such as sunlight and indoor light passes through the overcoat layer 7 and then through the colored portion 6 of the light reflecting areas 5H and is thereby colored, is scatteringly reflected by the reflection layer 4, passes again through the colored portion 6 of the light reflecting areas 5H, passes through the overcoat layer 7, and exits the color filter 11.

Here, because the depth t3 of the recessed portions 8 is set so that the thickness t1 of the colored portion 6 of the light transmitting areas 5T is twice as large as the thickness t2 of the colored portion 6 of the light reflecting areas 5H, source light 910 passing through the light transmitting areas 5T and external light 920 passing through the light reflecting areas 5H have the same optical path length, and the densities of display color by source light 910 and external light 920 are the same.

In the color filter 11, as described above, the area 5 has the light reflecting areas 5H and the light transmitting areas 5T, thus making it possible to provide a color filter compatible with a semi-transmitting and reflecting liquid crystal apparatus (display apparatus) having so-called "transmitting and reflecting modes".

In addition, by gauging the recessed portions 8 with the thickness thereof being adjusted, the optical path length of the light transmitting areas 5T can be set to a desired length, and therefore the display color by source light 910 can be made to have a desired density. Here, because the depth of the recessed portions 8 is defined with respect to the reflection surface of the light reflecting areas 5H so that the light reflecting areas 5H and the light transmitting areas 5T have the same optical path length in the colored portion 6, external light 920 and source light 910 passing through the colored portion 6 have the same optical path length, and thus the densities of display color in transmitting and reflecting modes can be made identical.

In addition, the recessed portions 8 is filled with the colored portion 6, whereby the thickness of the color filter 11 can be reduced, thus making it possible to improve the light transmittance.

In addition, the reflection layer 4 scatteringly reflects external light 920, thus making it possible to provide a display apparatus having a large viewing angle as a display screen, i.e., a wide viewing angle liquid crystal apparatus.

The method for producing a color filter of this embodiment will now be described with reference to FIGS. 3 to 12 using as an example the color filter 11 shown in FIG. 1.

The method for producing a color filter of this embodiment includes a reflection layer forming step of forming reflection layers 4 on one surface 2a of a substrate 2, a step of forming recessed portions 8, a bank forming step of forming banks 3, and a drying step of discharging a coloring ink onto areas 5 formed by banks 3, and then drying the coloring ink to form colored portions 6, and the banks 3 are composed of a transparent photosensitive resin film.

Figure 3:
FIG. 3 is a flow chart illustrating a method for producing the color filter of FIG. 1.
Figure 4:
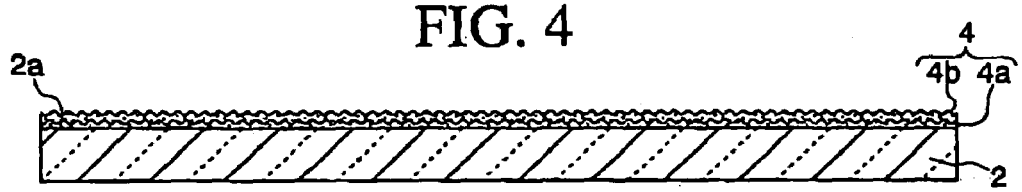
FIG. 4 is a flow chart illustrating the method for producing the color filter of FIG. 1.

First, as shown in FIG. 3, the transparent substrate 2 made of glass or plastic is prepared, and then the reflection layer 4 of the light reflecting areas 5H is formed as shown in FIG. 4.

First, a resin film 4a as a lower layer of the reflection layer 4 is formed on the entire surface 2a of the substrate 2. This resin film 4a is formed by coating the surface 2a with a resin composition prepared by dissolving a resin in a solvent by a spin coat process, and prebaking the coated resin composition to evaporate the solvent. Further, a special photomask is used to expose the resin film 4a to light, and etching is performed, whereby the surface of the resin film 4a is provided with irregularities.

Furthermore, the process for formation of the resin film 4a is not limited to the spin coat process, but coating processes such as an inkjet process may be employed.

Subsequently, a thin metal film 4b as an upper layer of the reflection layer 4 is formed using a spattering method. This thin metal film 4b is made of metal Al, and is formed along the surface of the resin film 4a, and therefore its surface has irregularities as in the case of the resin film 4a.

Figure 5:
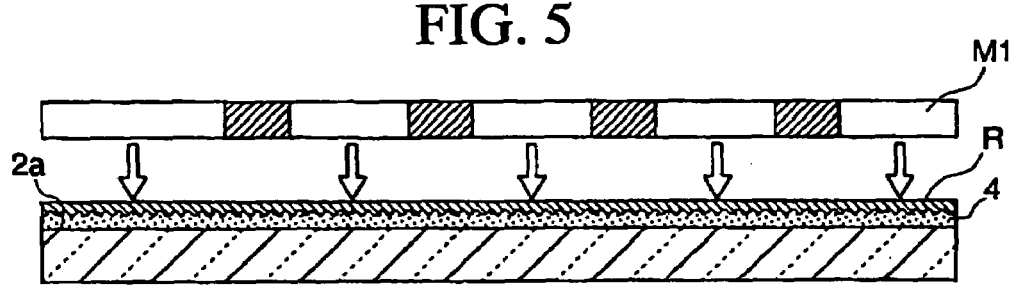
FIG. 5 is a flow chart illustrating the method for producing the color filter of FIG. 1.

Next, as shown in FIG. 5, a photoresist R is coated on the reflection layer 4 using a coating process such as a spin coat process, then a photomask M1 with a predetermined matrix pattern shape imaged thereon is placed on the reflection layer 4, and ultraviolet light is applied thereto for light exposure.

Figure 6:
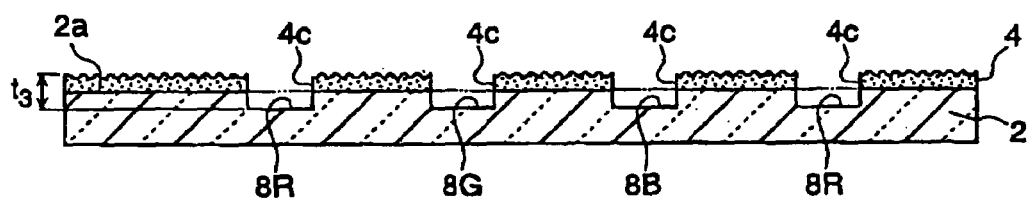
FIG. 6 is a flow chart illustrating the method for producing the color filter of FIG. 1.

Next, as shown in FIG. 6, the substrate 2 is dipped in, for example, an acidic etching solution to remove an exposed portion of the reflection layer 4 to form a hole 4c, and the dipping of the substrate 2 in the etching solution is continued, whereby the substrate 2 exposed through the hole 4c (section shown by the chain dash in FIG. 1) is etched to form recessed portions 8 on the substrate 2.

At this time, by adjusting conditions such as etching treatment time, the depth t3 of the recessed portions 8 is set so that the thickness t1 of the colored portion 6 of the light transmitting areas 5T is twice as large as the thickness t2 of the colored portion 6 of the light reflecting areas 5H.

In addition, the reflection layer 4 and recessed portions 8 are formed in one operation in one step. Thereafter, the remaining photoresist R is peeled away using sulfuric acid or the like.

Figure 7:
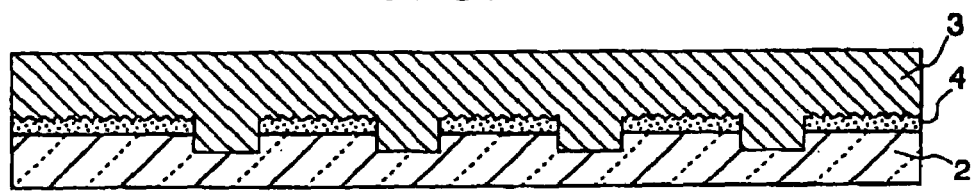
FIG. 7 is a flow chart illustrating the method for producing the color filter of FIG. 1.

Next, as shown in FIG. 7, a resin composition prepared by dissolving a transparent photosensitive resin as a material of the bank 3 in a solvent is uniformly coated on the reflection layer 4 and the recessed portions 8 by the spin coat process, and is prebaked to evaporate the solvent. This transparent photosensitive resin film includes, for example, a fluororesin such as hexafluoro polypropylene and a negative transparent acryl based photosensitive resin.

Furthermore, the process for coating the resin composition is not limited to the spin coat process, and coating processes such as an inkjet process may be employed.

Figure 8:
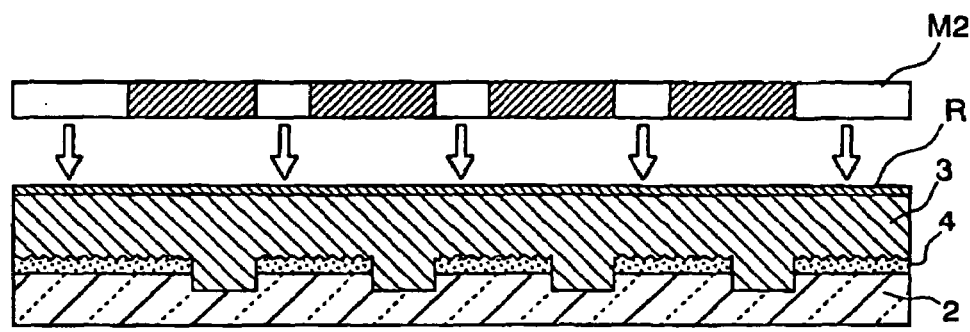
FIG. 8 is a flow chart illustrating the method for producing the color filter of FIG. 1.

Next, as shown in FIG. 8, a photoresist R is coated on the resin composition using a coating process such as a spin coat process, then a photomask M2 with a predetermined matrix pattern shape imaged thereon is placed on the bank 3, and ultraviolet light is applied thereto for light exposure.

Because the above transparent photosensitive resin film has ink repellency, and therefore even if a coloring ink droplet is erroneously discharged onto the top surface of the bank 3 when the colored portion is formed by the inkjet process, the coloring ink droplet is put in a target area with no coloring ink droplet remaining on the top surface, there is no possibility that color mixing will occur between adjacent colored portions, thus making it possible to form suitable colored portions 6.

Figure 9:
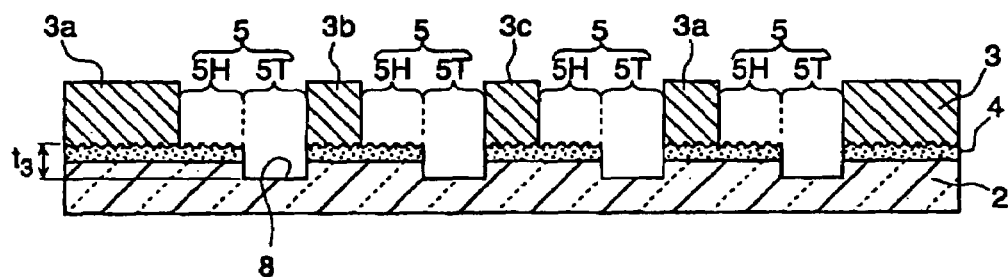
FIG. 9 is a flow chart illustrating the method for producing the color filter of FIG. 1.

Next, as shown in FIG. 9, the substrate 2 is dipped in, for example, an alkaline development solution to remove unexposed portions of the transparent photosensitive resin, whereby banks 3 are formed. Furthermore, after banks 3 are formed, after-baking is preferably performed to cure banks 3 sufficiently.

In this way, areas 5 constituted by light reflecting areas 5H and light transmitting areas 5T, each surrounded by the recessed portions 8, the bank 3 and the reflection layer 4, are formed.

Figure 10:
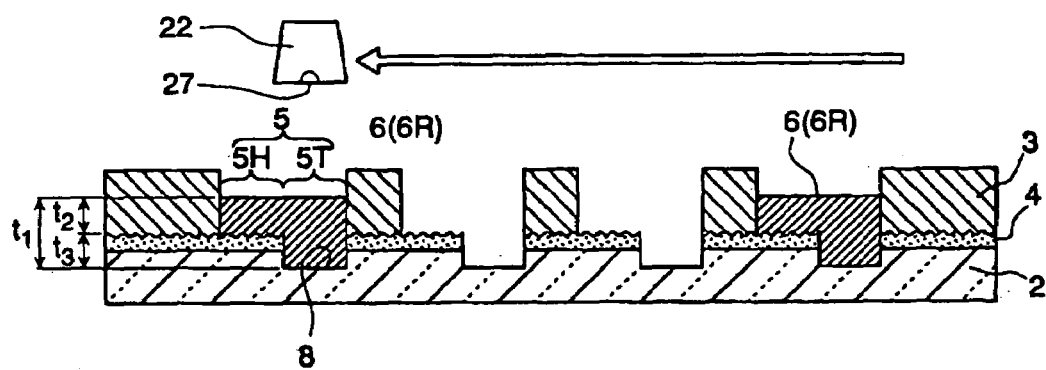
FIG. 10 is a flow chart illustrating the method for producing the color filter of FIG. 1.

Next, a colored portion 6R is formed using the inkjet process. As shown in FIG. 10, an inkjet head 22 is filled with a red coloring ink prepared by dispersing a red pigment in an organic solvent with an acrylic resin dissolved therein, and with a discharge nozzle 27 of the inkjet head 22 facing the area 5 and the inkjet head 22 and the substrate 2 being moved relative to each other, the red coloring ink is discharged to the area 5 from the discharge nozzle 27 as a coloring ink droplet with the liquid amount per one droplet. Consequently, the colored portion 6R of the same color is formed at one time in the light transmitting areas 5T and the light reflecting areas 5H.

Materials for use as the coloring ink include, for example, a material obtained by dispersing a red inorganic pigment in a polyurethane oligomer or polymethyl methacrylate oligomers, then adding cyclohexanone and butyl acetate as a low boiling point solvent and butyl-carbitol acetate as a high boiling point solvent, adding an nonionic surfactant as a dispersant, and adjusting and maintaining the viscosity in a predetermined range.

The discharged coloring ink is dried by baking or the like to form the red colored portion 6R. In addition, at this time, the ink discharge is controlled so that the thickness t1 of the colored portion 6 of the light transmitting areas 5T is twice as large as the depth t3 of the recessed portions 8, or the depth t3 of the recessed portions 8 equals the thickness t2 of the colored portion 6 in the light reflecting areas 5H to form the colored portion 6R.

In discharge of the coloring ink described above, an inkjet apparatus (droplet discharge apparatus) (not shown) is used, a piezo-system and a thermal system are effective as a drive system for the inkjet head 22.

Here, the piezo-system makes use of a nature of a piezo-element (piezoelectric element) being deformed when receiving a pulse-like electric signal, in which a space where a material is stored is pressurized via a deformable material by the piezo-element being deformed, and the material is pushed off from this space and discharged from a discharged nozzle.

In addition, the thermal system is such that a material is rapidly evaporated, generating bubbles using a heater provided in a space where the material is stored, and the material in the space is discharged under a pressure of bubbles.

Of droplet discharge techniques described above, the piezo-system has an advantage in that the composition of the material is not influenced because the material is not heated.

Figure 11:
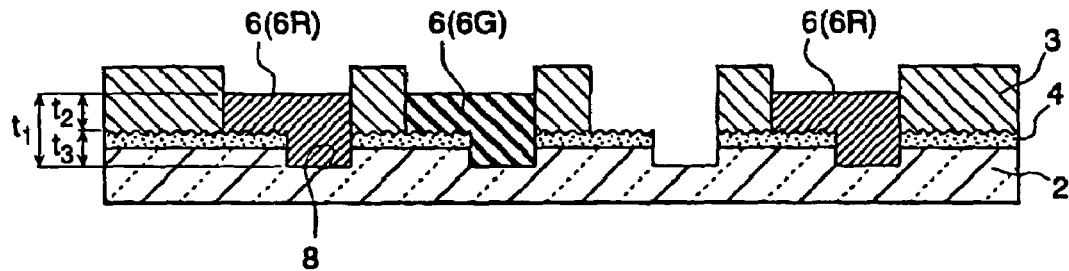
FIG. 11 is a flow chart illustrating the method for producing the color filter of FIG. 1.
Figure 12:
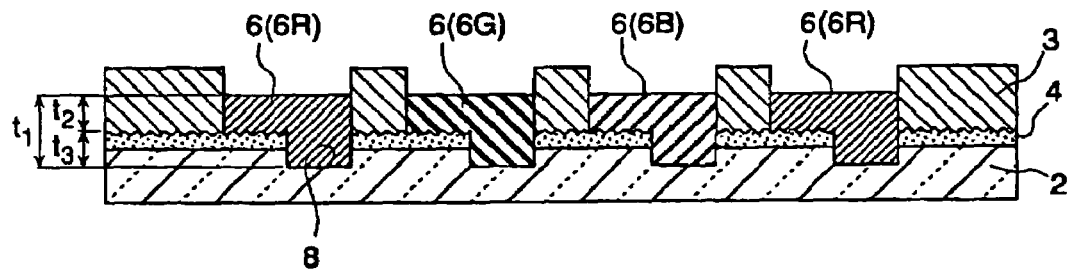
FIG. 12 is a flow chart illustrating the method for producing the color filter of FIG. 1.

Next, a green colored potion 6G is formed as shown in FIG. 11 in the same manner as in FIG. 10, and then a blue colored portion 6B is formed as shown in FIG. 12, whereby pixels of RGB can be formed.

Furthermore, for the color pattern of the colored portion 6 in this embodiment, an RGB system is employed, but the color pattern is not limited to the RGB system, and it may be the YMC system. In this case, Y denotes yellow, M denotes magenta and C denotes cyan.

Subsequently, after the colored portion 6 is formed, the overcoat layer 7 made of resin, covering the colored portion 6 and the bank 3, is formed by the spin coat process to obtain the color filter 11 shown in FIG. 1.

Furthermore, the process for formation of the overcoat layer 7 is not limited to the spin coat process, but a coating process such as an inkjet process may be employed.

According to the method for producing a color filter described above, the color filter 11 having light reflecting areas 5H and light transmitting areas 5T can be produced, thus making it possible to form a color filter compatible with a semi-transmitting and reflecting liquid crystal apparatus having so-called "transmitting and reflecting modes".

In addition, by adjusting conditions such as etching treatment time in formation of recessed portions 8, the optical path length of the light transmitting areas 5T can be set to a desired length, thus making it possible to form a color filter having a desired density of display color by source light 910. Here, because the recessed portions 8 is etched so that the light reflecting areas 5H and the light transmitting areas 5T have the same optical path length in the colored portion 6, and therefore the optical path lengths of external light 920 and source light 910 passing though the colored portion 6 are the same, and the densities of display color in transmitting and reflecting modes can thus be made identical.

In addition, the recessed portions 8 of the light transmitting areas 5T is filled with the colored portion 6, and thus the thickness of the color filter substrate can be reduced, thereby making it possible to form a color filter having an improved light transmittance.

In addition, the reflection layer 4 and the recessed portions 8 are formed in one operation in the same step, and therefore production processes can be simplified.

In addition, by discharging a coloring ink being a colored portion constituting material by the inkjet process, the colored portion 6 can be formed. In addition, the colored portion 6 of the same color can be formed at one time in the light transmitting areas 5T and the light reflecting areas 5H.

Furthermore, because formation of the colored portion 6 by photolithography is not performed, waste of materials of inks and production processes is reduced, production is simplified, and thus production costs can be reduced.

In addition, the bank 3 surrounds the area 5, and when a coloring ink is discharged toward the area 5, there is no possibility that the coloring ink will spread outside the area 5, and adjacent colored portions 6 contact one another to cause color mixing. Furthermore, even if a coloring ink is erroneously the top surface, the coloring ink is put in the target area with no coloring ink remaining on the top surface, thus eliminating the possibility that color mixing will occur between adjacent colored portions.

Furthermore, in this embodiment, a transparent photosensitive resin film is employed as a material of the bank 3 and the surface of the bank 3 has ink repellency, and a different material may be employed, and the material may be subjected to an ink repellency treatment. In addition, an ink repellency film may be coated on the bank 3.

Second Embodiment

Figure 13:
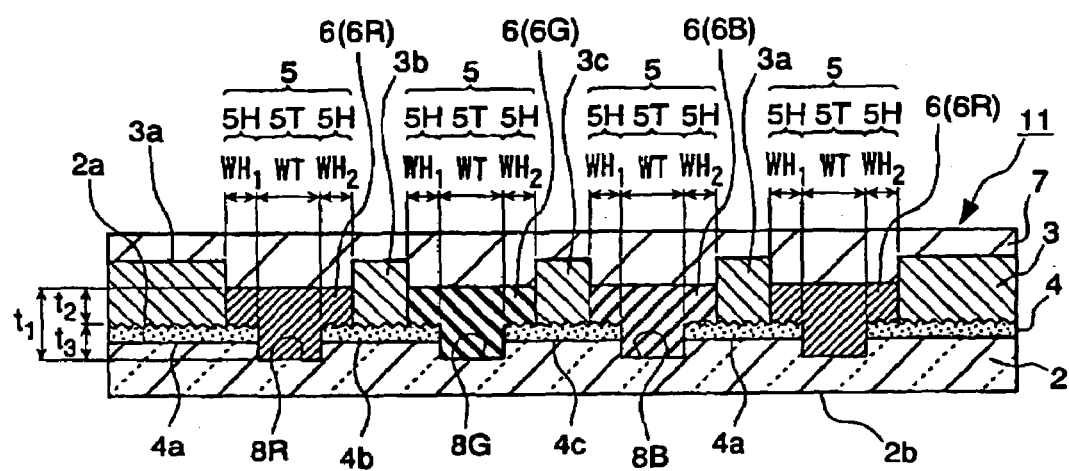
FIG. 13 is a sectional view of the color filter of the second embodiment of the present invention.

A color filter as the second embodiment of the present invention will now be described with reference to the drawings. FIG. 13 is a sectional view showing one example of this embodiment. Furthermore, of elements of the color filter shown in FIG. 13, elements identical to those of the color filter of the first embodiment shown in FIGS. 1 and 2 are given like symbols.

As shown in FIG. 13, for a color filter 11 as one example of this embodiment, light reflecting areas 5H and a light transmitting areas 5T are formed so that the widths WH1 and WH2 of the light reflecting areas 5H and the width WT of the light transmitting areas 5T have predetermined sizes in an area 5 partitioned by a bank 3. Therefore, the color filter is adjusted so that the ratio between the plane area of the light reflecting areas 5H and the plane area of the light transmitting areas 5T is a predetermined ratio.

In the color filter 11 configured in this way, an effect equivalent to that of the embodiment 1 described previously is exhibited, and the ratio between the plane area of the light reflecting areas 5H and the plane area of the light transmitting areas 5T is adjusted, whereby the brightness of display color in transmitting and reflecting modes is adjusted, thus making it possible to form a color filter displaying display in a desired way.

For example, when a liquid crystal apparatus for use under environments with less external light is formed, a display apparatus making maximum use of source light can be formed by making the light transmitting areas 5T of the color filter have a plane area larger than the plane area of the light reflecting areas 5H.

In addition, when a liquid crystal apparatus of low power consumption utilizing external light is formed, a display apparatus making maximum use of external light can be formed by making the light reflecting areas 5H of the color filter have a plane area larger than the plane area of the light transmitting areas 5T.

Furthermore, for the layouts of colored portions 6 of color filters shown in first and second embodiments, various kinds of layout patterns may be employed as shown in FIGS. 14A through 14C. For example, a stripe layout shown in FIG. 14A, a mosaic layout shown in FIG. 14B, or a delta layout shown in FIG. 14C may be employed.

Third Embodiment

A method for producing a color filter in the third embodiment of the present invention of the present invention will be described below with reference to the drawings.

Figure 15A:
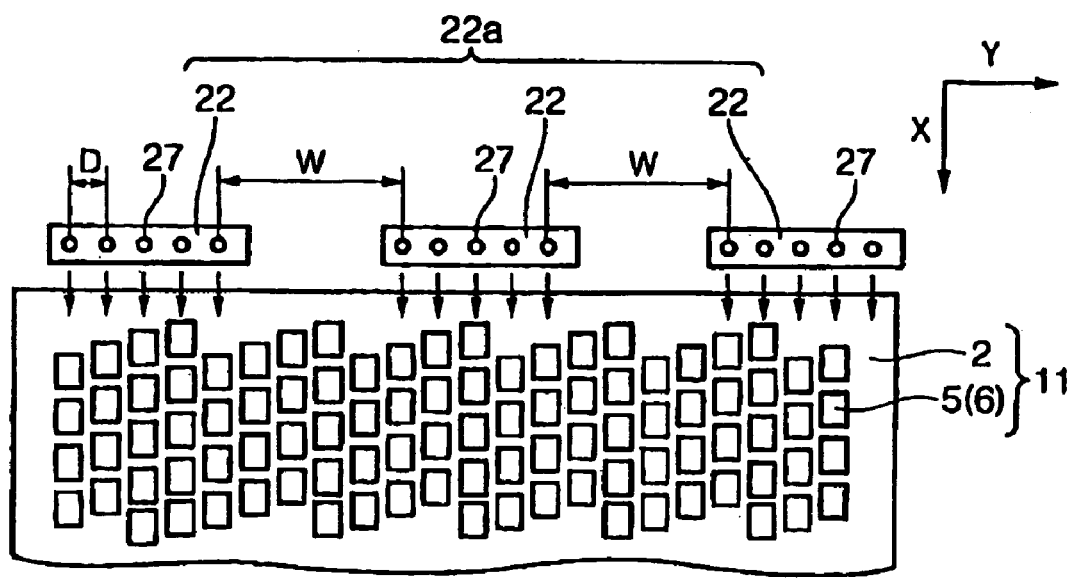
FIGS. 15A and 15B are plan views showing the method for producing the color filter of the third embodiment of the present invention.
Figure 15B:
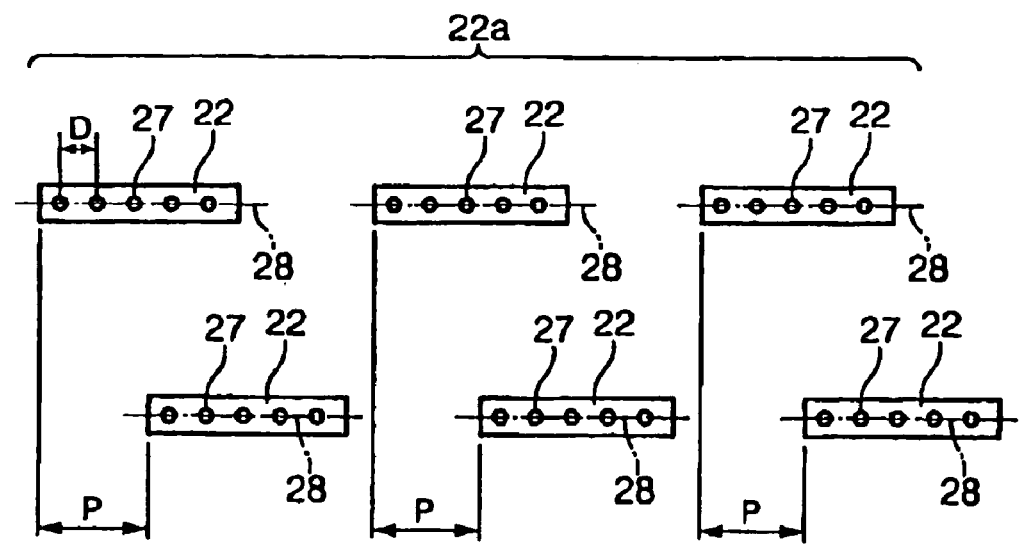

FIGS. 15A and 15B show how to use an inkjet head 22 in one embodiment of the method for producing a color filter according to the present invention.

In this embodiment, as shown in FIG. 15A, a printer head 22a having one or more inkjet heads 22 arranged at predetermined adjacent intervals is used. Each inkjet head 22 has a plurality of discharge nozzles 27 arranged in rows at fixed arrangement pitches D.

The printer head 22a main-scans a substrate 2 in a head scanning direction being a fixed direction (X direction being the longitudinal direction in FIG. 15A), and sub-scans the substrate 2 at predetermined shift pitches P in a head line feed direction orthogonal to the head scanning direction X (Y direction being lateral direction in FIG. 15A).

Each inkjet head 22 discharges a coloring ink from each of a plurality of discharge nozzles 27, and the discharged coloring ink is selectively supplied to a plurality of areas 5 on the substrate 2. Further, as required, main-scan and sub-scan of the inkjet head 22 are repeated several times to deposit the coloring ink on areas 5 of the substrate 2 in a predetermined shape and predetermined thickness. Consequently, colored portions 6 of predetermined shape and predetermined thickness are formed on the substrate 2.

If color display is provided using colored portions 6 corresponding to three primary colors of R (red), G (green) and B (blue) as in this embodiment, one colored portion 6 forms one display dot, and display dots of three colors of R, G, and B form one pixel as one unit.

In this embodiment, provided that the fixed pitch of discharge nozzles 27 is "D", and the distance between discharge nozzles 27 that are located at the endmost positions and are closest to each other, of a plurality of discharge nozzles 27 provided in each of inkjet heads 22 adjacent to each other, is "W", the relationship W=mD is specified (m is an integer of 2 or greater). That is, the distance W between discharge nozzles 27 adjacent to each other between inkjet heads 22 adjacent to each other is an integral multiple of the arrangement pitch D of discharge nozzles 27.

Also, provided that the sub-scan shift pitch in the head line feed direction Y of the printer head 22a is "P", and the fixed arrangement pitch of discharge nozzles 27 is "D" as shown in FIG. 15B, the relationship P=nD is specified (n is an integer of 1 or greater). That is, the shift pitch P of sub-scan of the inkjet head 22 is an integral multiple of the arrangement pitch D of discharge nozzles 27.

By specifying the above relationship between the distance W between discharge nozzles between inkjet heads adjacent to each other, and the shift pitch P of sub-scan, and the arrangement pitch D of discharge nozzles, the printer head 22a can be made to pass over areas 5 with discharge nozzles 27 correctly facing all areas 5 during main-scan and sub-scan of the printer head 22a, and therefore the imaging efficiency can be improved, and the ink can be discharged at desired locations. Consequently, colored portions 6, and hence pixels, of uniform plane shape and uniform thickness can be formed on the substrate 2.

Fourth Embodiment

A method for producing a color filter as the fourth embodiment of the present invention will be described below with reference to the drawings.

Figure 16:
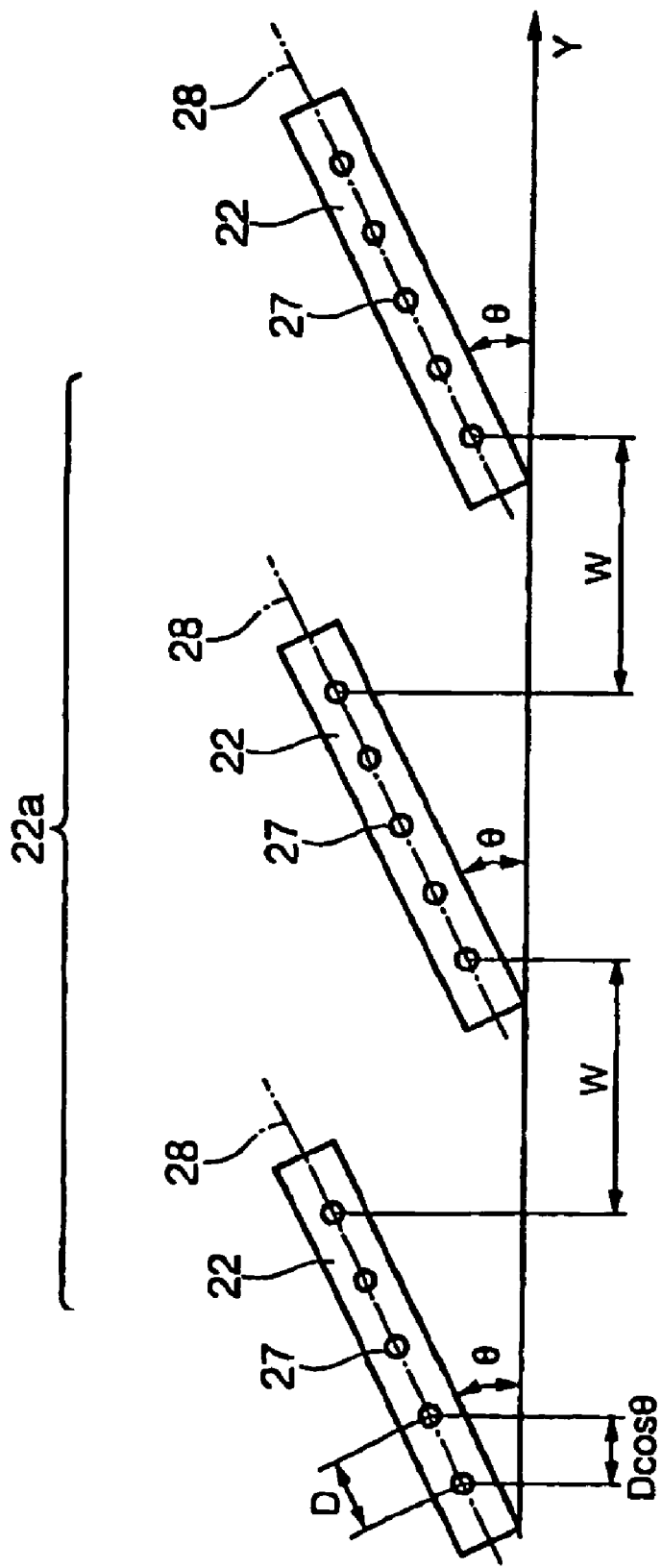
FIG. 16 is a plan view showing the method for producing the color filter of the fourth embodiment of the present invention.

FIG. 16 shows how to use an inkjet head 22 in one embodiment of the method for producing a color filter according to the present invention. In this embodiment, one or more inkjet heads 22 are each slanted at an angle of θ relative to the head line feed direction Y. It should be noted that θ is greater than 0° and also less than 180°.

Provided that the fixed arrangement pitch of discharge nozzles 27 is "D", the arrangement pitch of discharge nozzles 27 in the head line feed direction Y is "Dcosθ". Furthermore, provided that the distance between discharge nozzles 27 that are located at the endmost positions and are closest to each other, of a plurality of discharge nozzles 27 provided in each of inkjet heads 22 adjacent to each other, is "W", the relationship of W=mDcosθ is specified (m is an integer of 2 or greater). That is, the distance W in the head line feed direction between discharge nozzles 27 adjacent to each other between inkjet heads 22 adjacent to each other is an integral multiple of the arrangement pitch Dcosθ of discharge nozzles 27 in the head line feed direction.

Also, the sub-scan shift pitch P of the printer head 22a in the head line feed direction Y (see FIG. 15B) is made to equal an integral multiple of the arrangement pitch Dcosθ of discharge nozzles 27 in the head line feed direction Y, i.e., satisfy the relationship P=nDcosθ (n is an integer of 1 or more).

Due to this configuration, all discharge nozzles 27 of the inkjet head 22 can be made to correctly pass over areas on which pixels are to be formed even if the distance between colored portions 6 (see FIG. 15A) (i.e., pitch of colored portions) does not equal the arrangement pitch D of discharge nozzles, and therefore an ink can be discharged onto the substrate 2 at appropriate positions using all discharge nozzles 27. Consequently, the pixel formation efficiency, i.e., imaging efficiency, of the color filter can be improved.

Furthermore, in the printer head 22a shown in FIGS. 15A and 15B, or 16, one or more discharge nozzles 27 located at each of both ends of one or more inkjet heads 22, e.g., ten discharge nozzles 27 at each of the both ends, may discharge no ink onto the area 5 on the substrate 2.

In this way, even if ink discharge distribution characteristics along discharge nozzle rows 28 in the inkjet head 22 significantly vary, an appropriate amount of ink can be discharged from the inkjet head 22, and a colored portion having a uniform plane shape and thickness can be provided in each area 5 in the substrate 2.

In addition, in the case where the coloring ink includes sthree types of inks of R (red), G (green) and B (blue) when colored portions 6 are formed on the substrate 2 using the printer head 22a shown in FIGS. 15A and 15B, or 16, one or more inkjet heads 22 are grouped into three types so that all discharge nozzles 27 arranged in each inkjet head 22 discharge only one of three types of R, G, and B to form colored portions 6 of one color.

In this case, one or more inkjet heads 22 are arranged at predetermined adjacent intervals in the printer head 22a, and the substrate 2 is scanned with the printer head 22a, whereby colored portions 6 corresponding to the colors of R, G, and B can be formed on the substrate 2 at one time in one main-scan. In this way, the pixel formation efficiency, i.e., imaging efficiency can be improved.

In addition, if the coloring ink includes three types of inks of R, G, and B, a configuration may be employed in which plural independent channels, for example, three independent channels, are formed in at least one of a plurality of inkjet heads 22, and a different one of three types of inks of R, G, and B is introduced in each of the channels.

In this case, inks of different colors can be discharged from discharge nozzles 27 in the same inkjet head 22 and by this method, inks of R, G, and B colors can be discharged at one time in one main-scan to form colored portions 6 corresponding to the respective colors on the substrate 2. By this method, the pixel formation efficiency, i.e., imaging efficiency can be improved.

Fifth Embodiment

A color filter producing apparatus as the fifth embodiment of the present invention will be described below with reference to the drawings.

Figure 17:
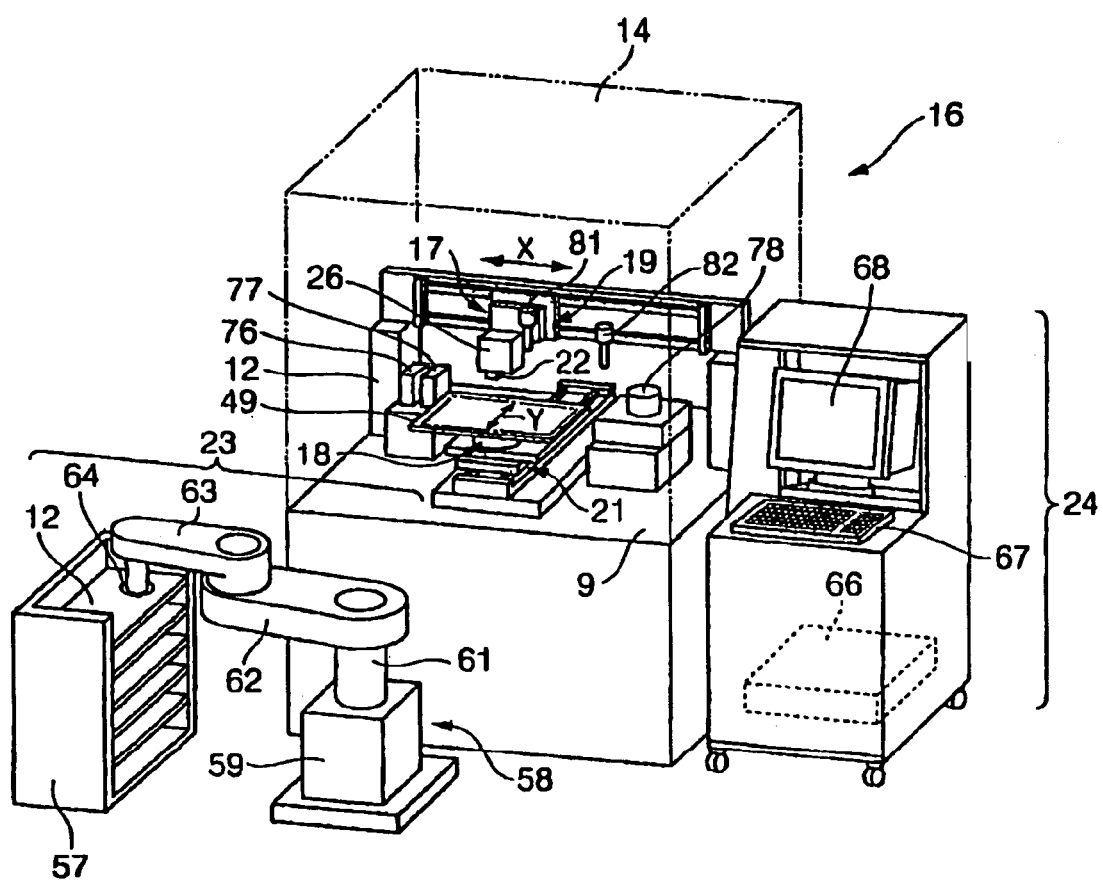
FIG. 17 is a plan view showing the method for producing the color filter of the fifth embodiment of the present invention.
Figure 18:
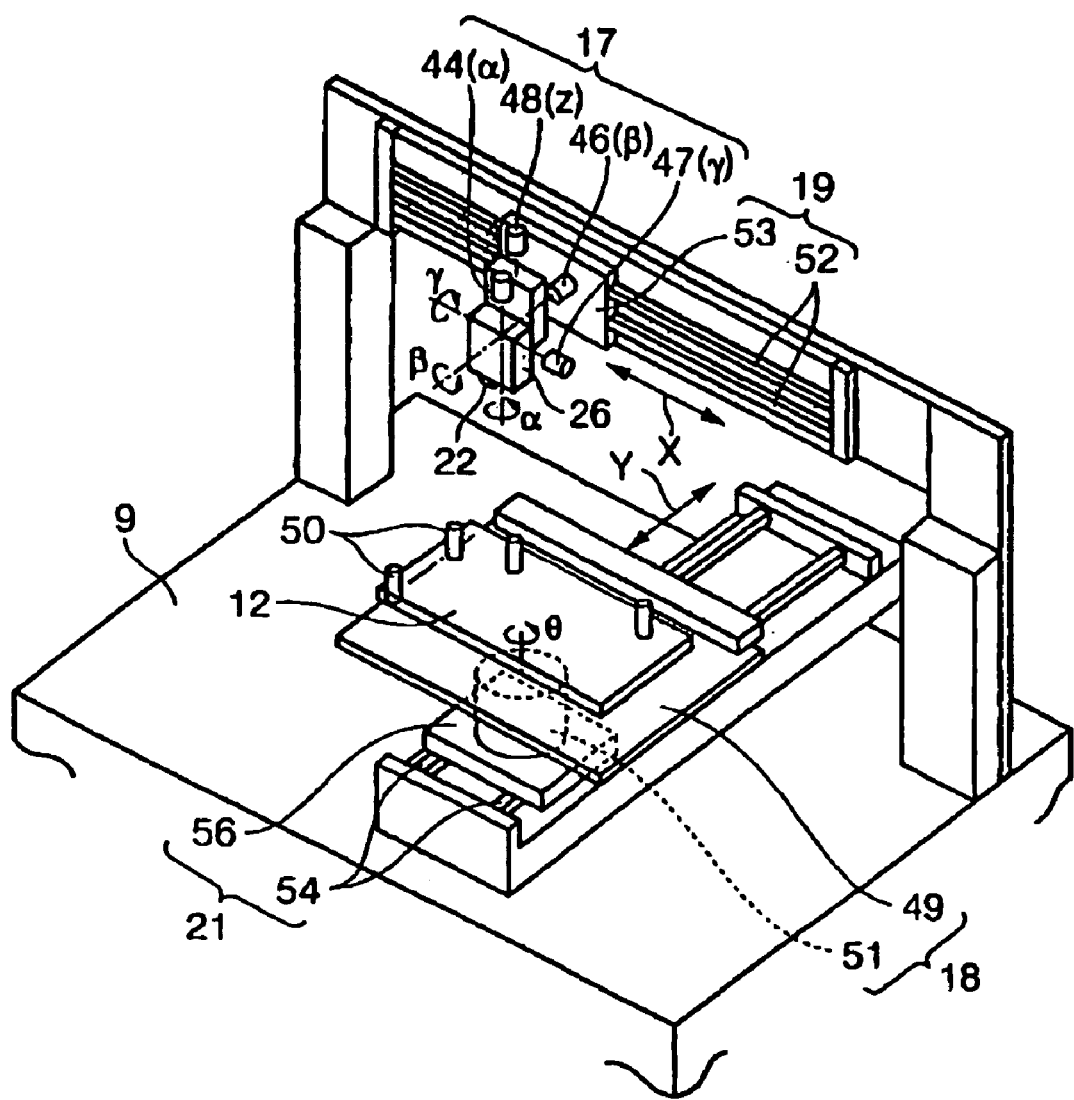
FIG. 18 is a plan view showing the method for producing the color filter of the fifth embodiment of the present invention.

FIGS. 17 and 18 show one embodiment of the color filter producing apparatus. A color filter producing apparatus 16 includes a printer head 22a (see FIGS. 15A and 15B) including a plurality of discharge nozzles 27, coloring ink supplying device (not shown) for supplying a coloring ink to a plurality of discharge nozzles 27, main-scan driver 19 (see FIGS. 16 and 19) for shifting the printer head 22a to main-scan the substrate 2, sub-scan driver 21 (see FIGS. 16 and 19) for shifting the printer head 22a to sub-scan the substrate 2, discharge nozzle discharge controller (not shown) for controlling operations of discharge nozzles 27, main-scan controller (not shown) for controlling operations of main-scan driver 19, and sub-scan controller (not shown) for controlling operations of sub-scan driver 21.

In the configuration described above, the printer head 22a is formed such that one or more inkjet heads 22 each having a plurality of discharge nozzles 27 arranged in rows at fixed arrangement pitches D are arranged at predetermined adjacent intervals. In addition, the coloring ink supplying device (not shown) supplies the coloring ink to a plurality of discharge nozzles 27 constituting the printer head 22a. The supplied coloring ink is selectively discharged to areas 5, and hence pixel formation areas, on the substrate 2 from the discharge nozzles 27 to form colored portions 6.

The main-scan driver 19 shifts the printer head 22a in a head scanning direction being a fixed direction (i.e., longitudinal direction X in FIG. 15A) to scan the substrate 2. In addition, the sub-scan driver 21 shifts the printer head 22a at predetermined shift pitches P (see FIG. 15B) in a head line feed direction Y to sub-scan the substrate 2. In addition, the discharge nozzle discharge controller (not shown) controls the discharge amount and discharge time of the coloring ink discharged from a plurality of discharge nozzles 27.

In the color filter producing apparatus 16 in this embodiment, the printer head 22a is shifted in a head scanning direction being a fixed direction (i.e., longitudinal direction X in FIG. 15A) to main-scan the substrate 2. Also, the printer head 22a is shifted in a head line feed direction Y at predetermined shift pitches P to sub-scan the substrate 2.

During the main-scan and sub-scan, the coloring ink is selectively discharged to areas 5, hence pixel formation areas, on the substrate 2 from a plurality of discharge nozzles 27 arranged in one or more inkjet heads 22. In addition, as required, the main-scan and sub-scan are repeated two or more times to deposit the coloring ink on areas 5, and hence pixel formation areas, of the substrate 2 in a predetermined shape and thickness. In this way, colored portions 6 having a predetermined shape and thickness are provided on the substrate 2.

In addition, the color filter producing apparatus 16 is configured so that the distance W between discharge nozzles 27 that are located at the endmost positions of each of inkjet heads 22 and are closest to each other equals an integral multiple of the arrangement pitch D of discharge nozzles 27, i.e., the relationship W=mD is satisfied (m is an integer of 2 or greater) as shown in FIG. 15A. It is also configured so that the sub-scan shift pitch P in the head line feed direction Y of the printer head 22a equals an integral multiple of the fixed arrangement pitch D of discharge nozzles 27, i.e., the relationship P=nD is satisfied (n is an integer of 1 or greater).

Figure 19A:
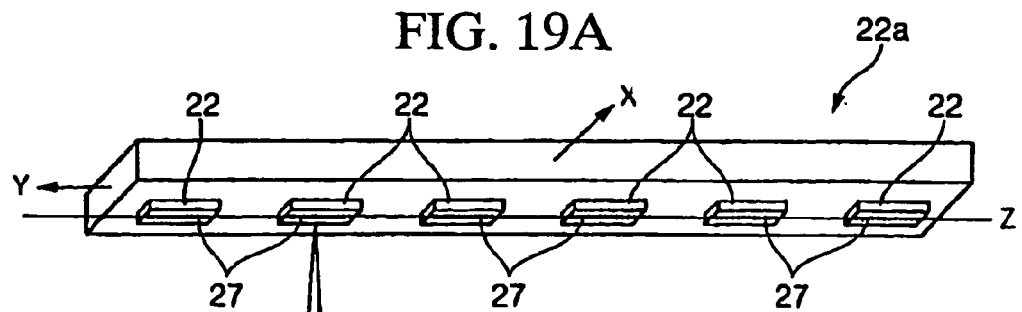
FIGS. 19A through 19C are perspective views showing one example of a printer head for use in a color filter producing apparatus.
Figure 19B:
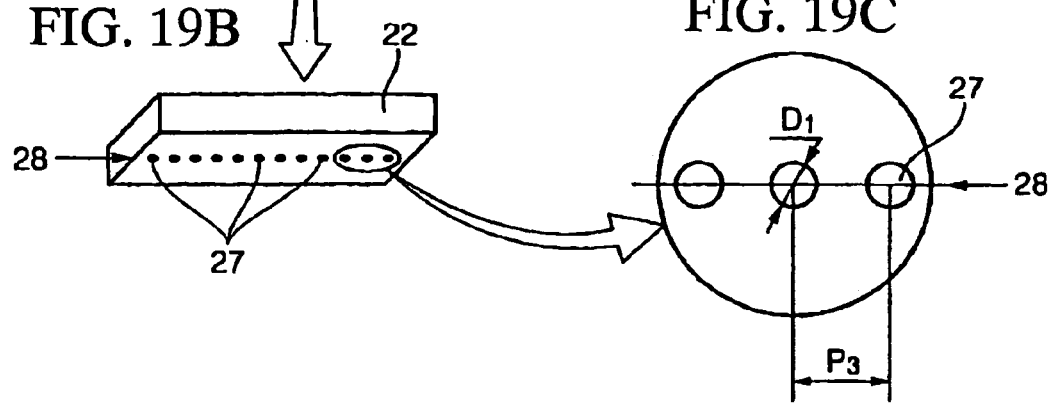
Figure 19C:
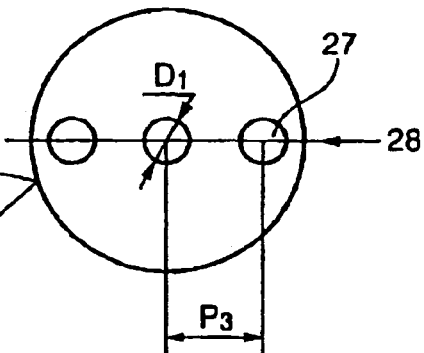

FIGS. 19A through 19C show one example of the printer head 22a in the color filter producing apparatus 16. In this example, the printer head 22a has six inkjet heads 22, and each inkjet head 22 is provided with a linear discharge nozzle row 28 constituted by a plurality of discharge nozzles 27, e.g., twelve discharge nozzles 27. The arrangement pitch P3 of discharge nozzles 27 is, for example, 141 μm, the diameter D1 of the discharge nozzle 27 is, for example, 28 μm, and the pitch at which colored portions are formed is, for example, 141 μm.

Furthermore, as described previously, inkjet heads 22 can each be slanted at an angle of θ with respect to the head line feed direction Y as shown in FIG. 16. This angle θ is greater than 0° and also smaller than 180°. In this case, an arrangement can be made so that the distance W between discharge nozzles 27 at the endmost positions adjacent to each other in inkjet heads 22 adjacent to each other equals an integral multiple of the arrangement pitch Dcosθ of discharge nozzles 22 in the head line feed direction Y, i.e., the relationship W=mDcosθ is satisfied (m is an integer of 2 or more).

Also, an arrangement can be made so that the sub-scan shift pitch P in the head line feed direction Y of the printer head 22a (see FIG. 15B) equals an integral multiple of the arrangement pitch Dcosθ of discharge nozzles 27 in the head line feed direction Y, i.e., the relationship P=nDcosθ is satisfied (n is an integer of 1 or greater).

Figure 20:
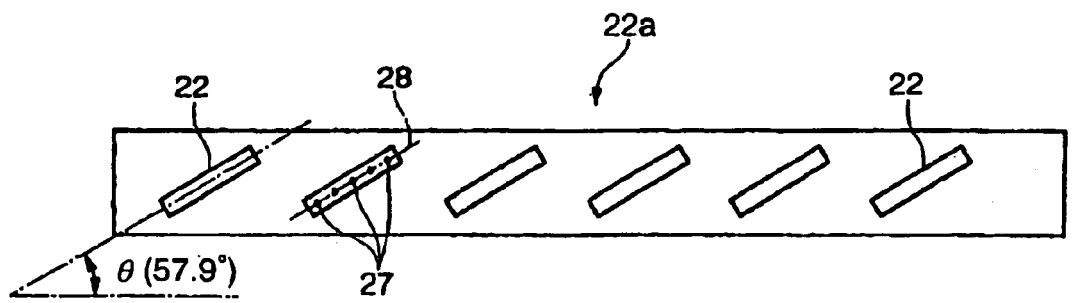
FIG. 20 is a perspective view showing one example of the printer head for use in the color filter producing apparatus.

FIG. 20 shows another example of the printer head 22a in the color filter producing apparatus 16. In this example, the printer head 22a has six inkjet heads 22, and each inkjet head 22 is provided with a discharge nozzle row 28 constituted by a plurality of discharge nozzles 27, e.g., twelve discharge nozzles 27. The inkjet head 22 is slanted at an angle of θ, and this slant angle θ is set to, for example, 57.9°.

In addition, the arrangement pitch of discharge nozzles 27 is, for example, 141 μm, the diameter of the discharge nozzle 27 is, for example, 28 μm, and the pitch at which colored portions (i.e., pixels) are formed is, for example, 75 mμ.

An inkjet device provided in the color filter producing apparatus 16 will now be described in detail with reference to FIG. 17. The inkjet device is an apparatus for discharging a coloring ink of one of R, G, and B colors, for example a coloring ink of R color, to predetermined positions in the color filter 11 as ink droplets to deposit the same thereon. The inkjet device for a coloring ink of G color and a coloring ink of B color is provided, respectively, and such inkjet devices may have a structure similar to the structure shown in FIG. 17.

In FIG. 17, the color filter producing apparatus 16 includes a head unit 26 including a printer head 22a (see FIGS. 15A and 15B) having one or more inkjet heads 22 arranged at predetermined arrangement intervals, head position controller 17 for controlling the position of the printer head 22a, substrate position controller 18 for controlling the position of a mother substrate 12, main-scan driver 19 for making a main-scan shift of the inkjet head 22 over the mother substrate 12, sub-scan shift driver 21 for making a sub-scan shift of the inkjet head 22 over the mother substrate 12, a substrate feeder 23 for feeding the mother substrate 12 to a predetermined work position in inkjet device, and a controller 24 for performing general control of the inkjet devices.

The mother substrate used herein is a large area substrate serving as a base material of the substrate 2 on which the color filter 11 is formed. By cutting the mother substrate, a plurality of substrates 2 described above can be formed. Specifically, a pattern equivalent to one color filter 11 is first formed on each of a plurality of color filters 11 in the mother substrate 12, cutting grooves are formed around the color filters 11, and the mother substrate 12 is cut along the grooves, whereby individual color filters 11 can be formed.

Head position controller 17, substrate position controller 18, main-scan driver 19 and sub-scan driver 21 are placed on a base 9. In addition, those apparatuses are each covered by a cover 14 as required.

Figure 21:
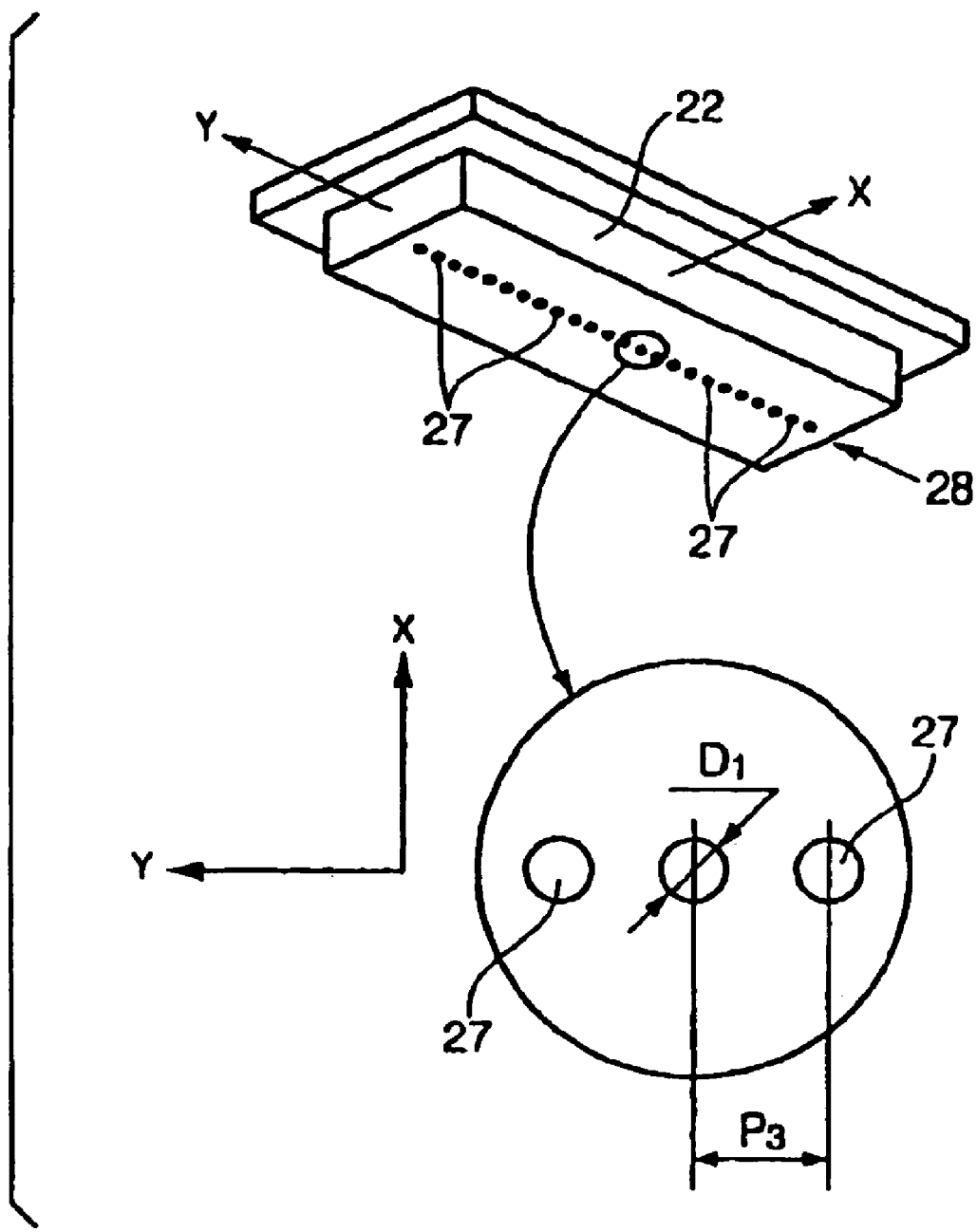
FIG. 21 is an enlarged perspective view of an inkjet head for use in the color filter producing apparatus.

The inkjet head 22 has a discharge nozzle row 28 formed by arranging a plurality of discharge nozzles 27 in a row as shown in FIG. 21, for example. The number of discharge nozzles 27 is, for example, 180, the hole diameter D1 of discharge nozzles 27 is, for example, 28 μm, and the discharge nozzle pitch P3 between discharge nozzles 27 is, for example, 141 μm. Furthermore, the head scanning direction (i.e., main-scan direction) X with respect to the color filter 11 and the mother substrate 12, and the sub-scanning direction Y orthogonal thereto correspond to the X direction and the Y direction in FIG. 21, respectively.

In addition, as shown in FIG. 22, a coloring ink may be supplied to one area 5 by two discharge nozzles 27 on the same main-scan line by providing two discharge nozzle rows 28 along the head scanning direction X. At this time, the arrangement pitch P3 of discharge nozzles 27 may be set to about 141 μm.

Figure 23:
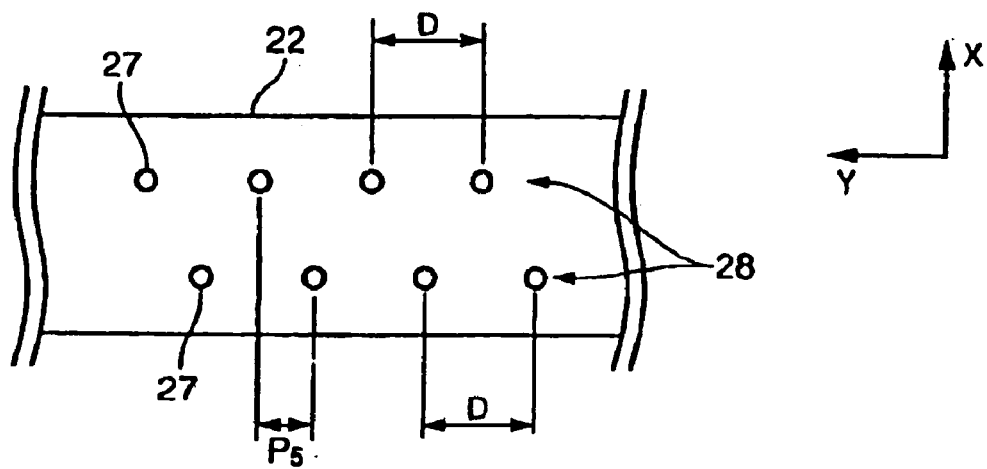
FIG. 23 is an enlarged plan view of the inkjet head for use in the color filter producing apparatus.

In addition, as shown in FIG. 23, two discharge nozzle rows 28 may be provided along the head scanning direction X, and furthermore, a plurality of discharge nozzles 27 may be provided in a zigzag form to supply the coloring ink to the area 5 through these discharge nozzles 27 (see FIG. 15A). Furthermore, in this case, if the arrangement pitch D of discharge nozzles 27 is 141 μm, then a substantial pitch P5 between a plurality of scan lines extending in the main-scanning direction X equals ½ of the arrangement pitch D, i.e., 70.5 μm.

Figure 24:
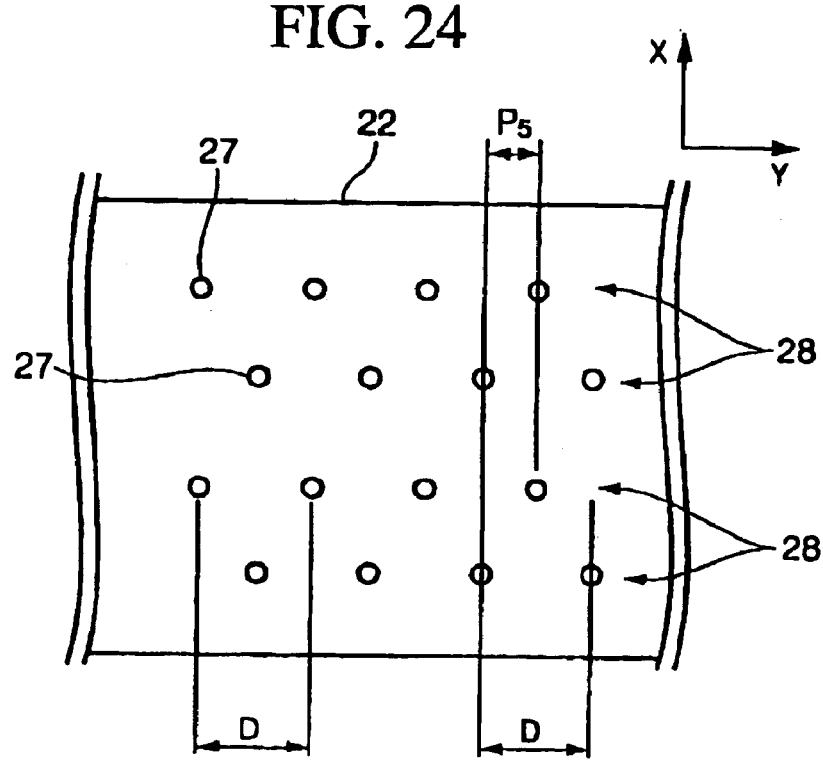
FIG. 24 is an enlarged plan view of the inkjet head for use in the color filter producing apparatus.

In addition, as shown in FIG. 24, the inkjet head 22 may be configured such that a plurality of sets of pairs of discharge nozzle rows 28 adjacent to each other along the head scanning direction X are provided, and a plurality of discharge nozzles 27 included in the pair of discharge nozzle row 28 are arranged in a zigzag form to supply the colored to areas 5 by these discharge nozzles 27. Furthermore, FIG. 24 shows two sets of pairs of discharge nozzle rows 28 with each pair of discharge nozzle rows 28 having discharge nozzles 27 arranged in a zigzag form. In addition, the arrangement pitch D of discharge nozzles 27 is 141 μm, but a substantial pitch P5 in a main-scan line extending in the X direction is ½ of the arrangement pitch D, i.e., 70.5 μm.

Figure 25:
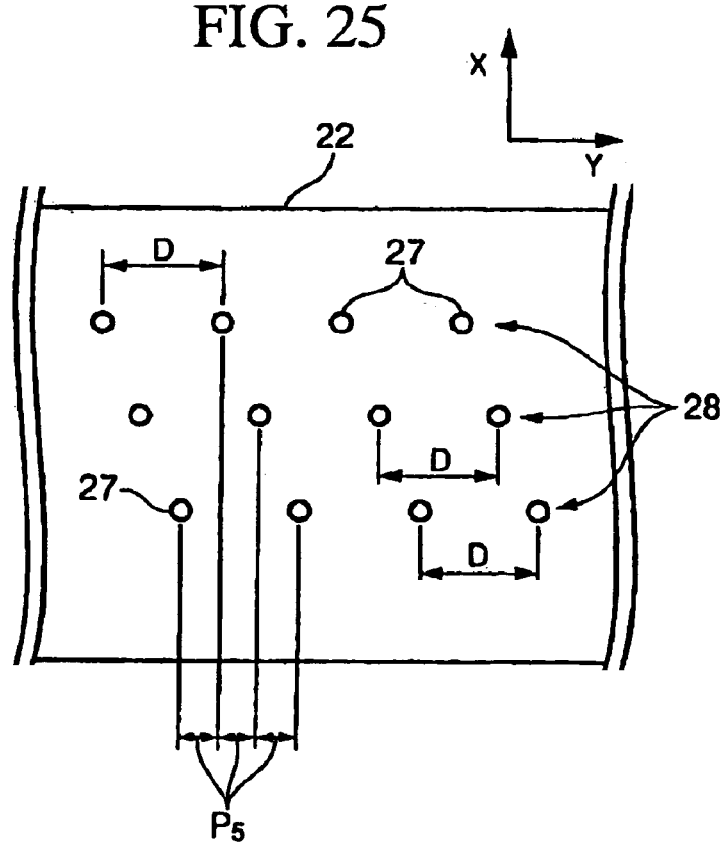
FIG. 25 is an enlarged plan view of the inkjet head for use in the color filter producing apparatus.

In addition, as shown in FIG. 25, three discharge nozzle rows 28 may be arranged along the head scanning direction X in such a manner that they are shifted by one-third of the pitch one after another to supply the coloring ink to areas 5. In this case, the arrangement pitch D of discharge nozzles 27 is 141 μm, but a substantial pitch P5 in a main-scan line extending in the X direction is ⅓ of the arrangement pitch D, i.e., 47 μm.

Figure 26A:
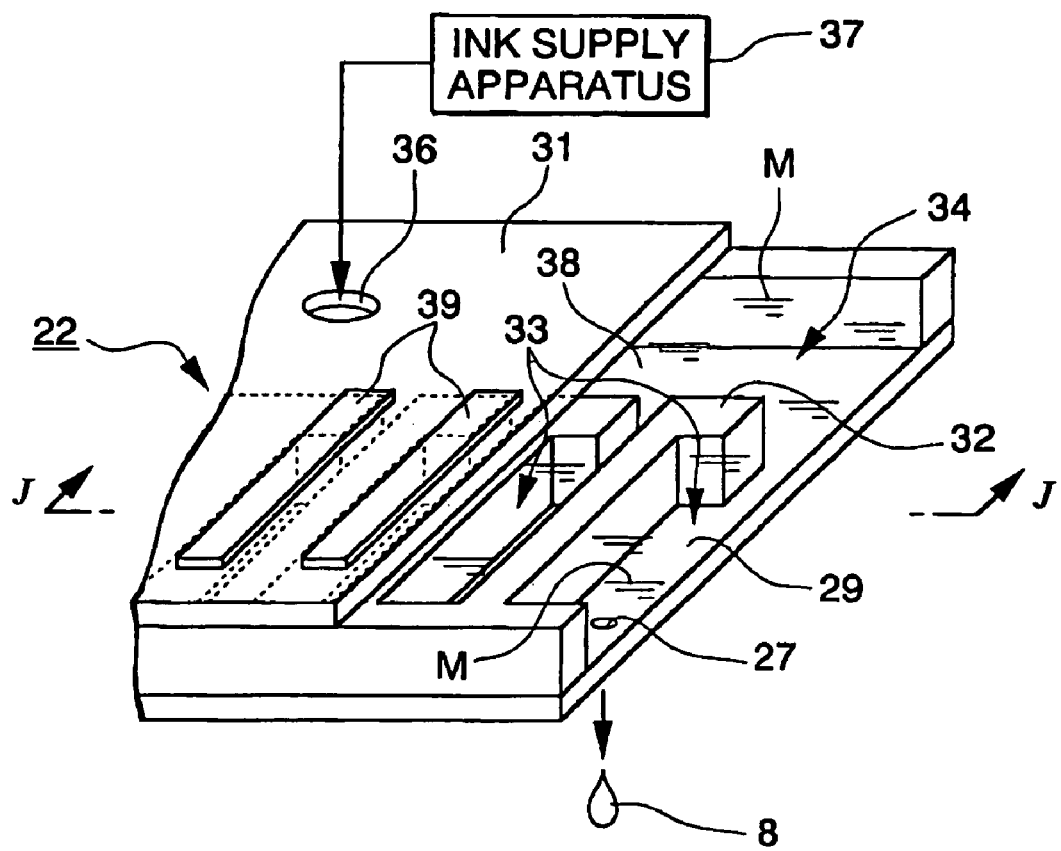
FIGS. 26A and 26B show one example of an inner structure of the inkjet head.

The inkjet head 22 is configured to have a discharge nozzle row 28 positioned in a direction orthogonal to the head scanning direction X as shown in FIG. 15B and in some cases, the inkjet head 22 is scanned at a predetermined angle of θ with respect to the direction orthogonal to the head scanning direction X as shown in FIG. 16. The inkjet head 22 selectively discharges the coloring ink from a plurality of discharge nozzles 27 to deposit the coloring ink in areas 5 in the substrate 2 while traveling in parallel in the head scanning direction X. In addition, the inkjet head 22 is made to travel in parallel in the sub-scanning direction Y by a predetermined distance so that a position of main-scanning by the inkjet head 22 can be shifted by a predetermined distance. The inkjet head 22 has an inner structure shown in FIGS. 26A and 26B, for example. Specifically, the inkjet head 22 has, for example, a stainless steel discharge nozzle plate 29, a diaphragm 31 facing the discharge nozzle plate 29, and a plurality of partition members 32 for jointing them together. A plurality of ink chambers 33 and a liquid reservoir 34 are formed between the discharge nozzle plate 29 and the diaphragm 31 by partition members 32. the plurality of ink chambers 33 and the liquid reservoir 34 communicate with each other via a channel 38.

An ink feed orifice 36 is formed at an appropriate position in the diaphragm 31, and an ink supply apparatus 37 is connected to the ink feed orifice 36. This ink supply apparatus 37 supplies a coloring ink of one color of R, G, and B colors, for example a coloring ink of R color to the ink feed orifice 36. The supplied coloring ink is filled in the liquid reservoir 34, then passes through the channel 38 and is filled in the ink chamber 33.

Figure 26B:
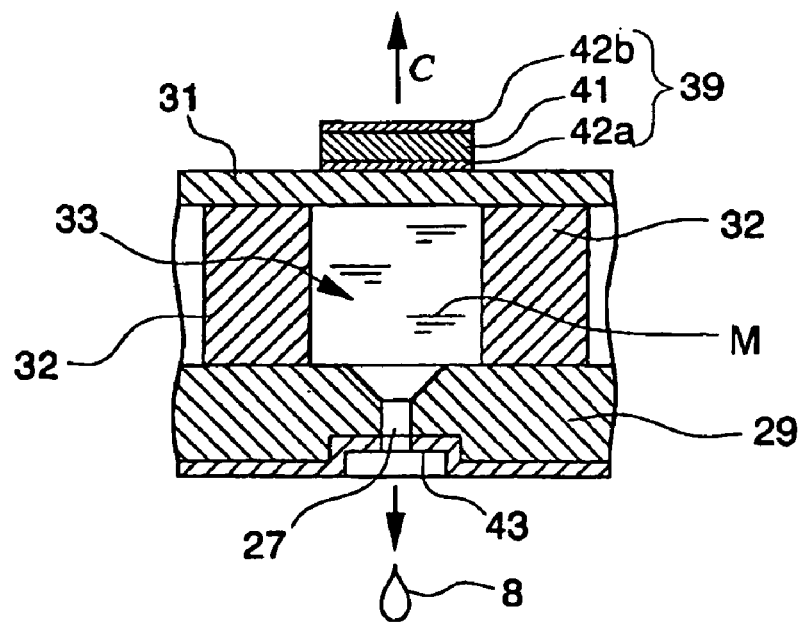

A discharge nozzle 27 for jet-spraying the coloring ink from the ink chamber 33 is provided in the discharge nozzle plate 29. In addition, on the surface opposite to the surface of the diaphragm 31 on which the ink chamber 33 is formed, an ink pressing body 39 is mounted in correspondence to the ink chamber 33. As shown in FIG. 26B, the ink pressing body 39 has a piezoelectric element 41, and a pair of electrodes 42a and 42b holding the piezoelectric element therebetween. The piezoelectric element 41 is deformed in such a manner as to protrude outwardly as shown by arrow C by passage of a current through electrodes 42a and 42b and consequently, the volume of the ink chamber 33 increases. Thereupon, an amount of coloring ink equivalent to the increment of volume passes from the liquid reservoir 34 into the ink chamber 33 through the channel 38.

Then, when the passage of a current through the piezoelectric element 41 is stopped, the piezoelectric element 41 and the diaphragm 31 both return to their original shapes. Consequently, the ink chamber 33 also returns to its original volume, and therefore the pressure of the coloring ink existing in the ink chamber 33 increases, causing the coloring ink to be discharged as droplets from the discharge nozzle 27 toward the substrate 2 (see FIG. 10). Furthermore, for example, an ink repellency layer 43 composed of a Ni-tetrafluoroethylene eutectoid plated layer is provided around the discharge nozzle 27 for preventing flight deflection of droplets, hole clogging of the discharge nozzle 27, and the like.

In FIG. 18, head position controller 17 includes an α motor 44 for rotating the printer head 22a in plane, a β motor 46 for variably rotating the printer head 22a about an axial line parallel to the sub-scan direction Y, a γ motor 47 for variably rotating the printer head 22a about an axial line parallel to the head scanning direction X, and a Z motor for making the printer head 22a travel in parallel in the vertical direction.

As shown in FIG. 18, substrate position controller 18 shown in FIG. 17 includes a table 49 on which the mother substrate 12 is placed, and a θ motor 51 for rotating the table 49 in plane as shown by arrow θ. In addition, as shown in FIG. 18, main-scan driver 19 shown in FIG. 17 includes a guide rail 52 extending in the head scanning direction X, and a slider 53 including therein a pulse-driven linear motor. The slider 53 travels in parallel in the head scanning direction X along the guide rail 52 when the built-in linear motor is activated.

In addition, as shown in FIG. 18, sub-scan driver 21 shown in FIG. 17 includes a guide rail 54 extending in the sub-scanning direction Y, and a slider 56 including therein a pulse-driven linear motor. The slider 56 travels in parallel in the sub-scanning direction Y along the guide rail 54 when the built-in linear motor is activated.

The linear motor pulse-driven in the sliders 53 and 56 is capable of precisely controlling a rotation angle of an output shaft with a pulse signal supplied to the motor, thus making it possible to highly precisely control a position of the inkjet head 22 supported by the slider 53 on the head scanning direction X, a position of the table 49 on the sub-scanning direction Y and the like.

Furthermore, the control of the positions of the printer head 22a and the table 49 is not limited to position control using a pulse motor, but may be feedback control using a servo motor, or control using any other control method.

Substrate supplying device 23 shown in FIG. 17 includes a substrate housing portion 57 for housing the mother substrate 12, and a robot 58 for transporting the mother substrate 12. The robot 58 includes a base pad 59 placed on an installation surface such as a floor or ground, a vertically moving shaft 61 vertically moving relative to the base pad 59, a first arm 62 rotating about the vertically moving shaft 61, a second arm 63 rotating relative to the first arm 62, and a suction pad 64 provided on the lower part of the leading end of the second arm 63. The suction pad 64 can make the mother substrate 12 adhere thereto by means of air suction or the like.

In FIG. 17, capping device 76 and cleaner 77 are provided under the trajectory of the printer head 22a driven by main-scan driver 19 to make a main-scan shift and at one side position of sub-scan driver 21. In addition, an electronic balance 78 is provided at the other side position. Cleaner 77 is intended for cleaning the inkjet head 22. The electronic balance 78 is a device for measuring for each discharge nozzle the weight of ink droplets discharged from individual discharge nozzles 27 in the inkjet head 22 (see FIG. 21). Capping device 76 is intended for preventing discharge nozzles 27 (see FIG. 21) from drying when the inkjet head 22 is in a stand-by state.

Near the printer head 22a, a camera for head 81 is so situated as to travel integrally with the printer head 22a. In addition, a camera for substrate 82 supported on a support apparatus (not shown) provided on a base 9 is placed at a position allowing the mother substrate 12 to be shot.

Figure 27:
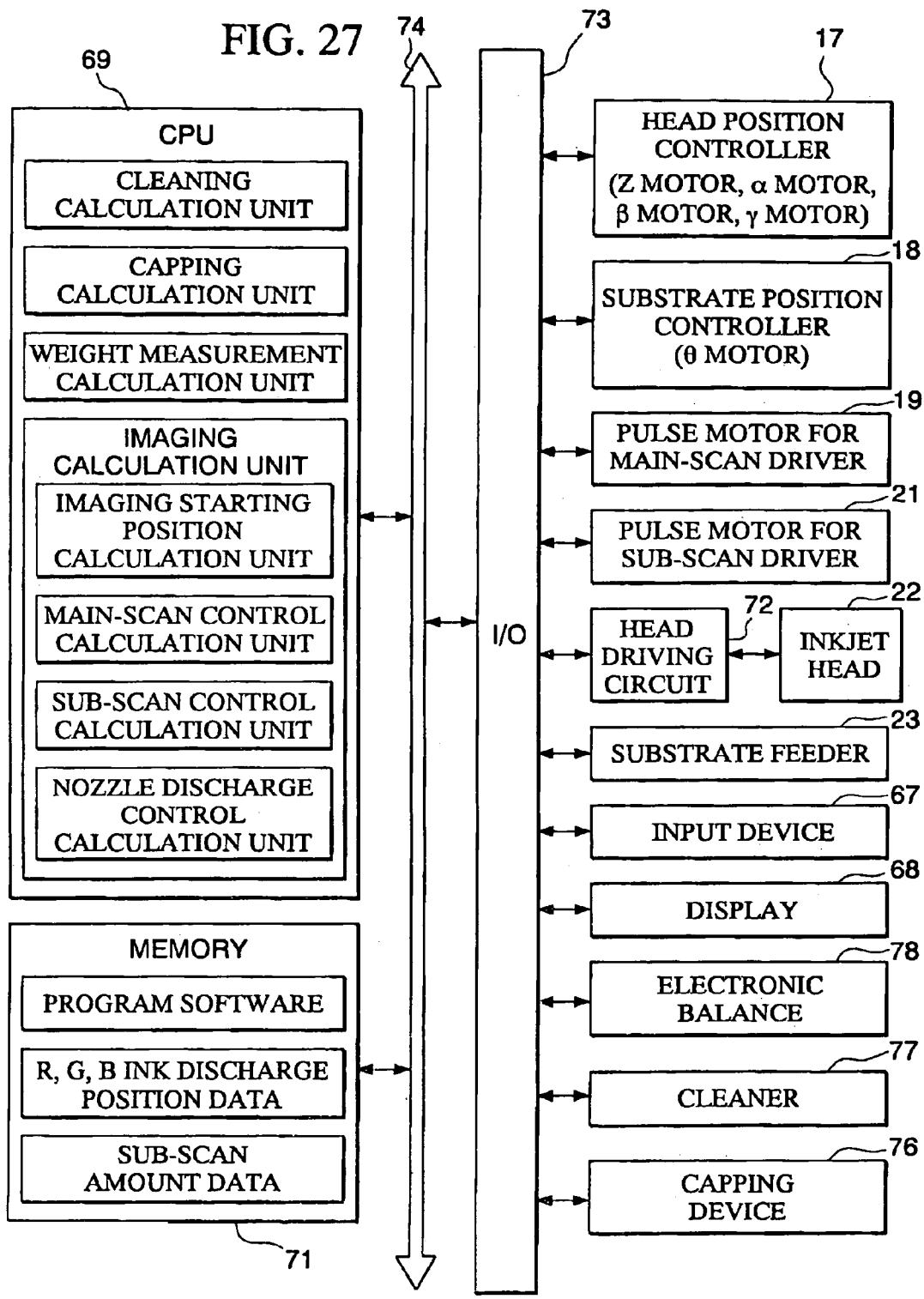
FIG. 27 is a block diagram showing an electric control system for use in the color filter producing apparatus.

The controller 24 shown in FIG. 17 includes a computer main body 66 including a processor, a keyboard 67 as an input device, and a CRT (Cathode Ray tube) display 68 as a display apparatus. As shown in FIG. 27, the processor includes a CPU (Central Processing Unit) 69 performing calculation processing, and a memory 71 as an information storage medium storing various kinds of information.

Head position controller 17, substrate position controller 18, main-scan driver 19, sub-scan driver 21, and a head drive circuit 72 for driving the piezoelectric element 41 (see FIG. 26B) in the inkjet head 22 are connected to the CPU 69 via an input/output interface 73 and a bus 74. The substrate feeder 23, the input device 67, the display 68, the electronic balance 78, cleaner 77 and capping device 76 are also connected to the CPU 69 via the input/output interface 73 and the bus 74.

The memory 71 conceptually includes semiconductor memories such as a RAM (Random Access Memory) and a ROM (read Only Memory), and external storage units such as a hard disk, a CD-ROM reader and a disk type storage medium, and has, from a functional viewpoint, a storage area for storing program software having described therein a procedure for controlling operations of inkjet devices, a storage area for storing as coordinate data a discharge position in the mother substrate 12 for one (e.g., R color) of R, G, and B colors for achieving various kinds of sequences as to R, G, and B colors shown in FIGS. 14A through 14C, a storage area for storing an amount of sub-scan shift of the mother substrate 12 in the sub-scanning direction Y in FIG. 18, an area functioning as a work area for the CPU 69, a temporary file and the like, and various kinds of other storage areas.

The CPU 69 performs control for discharging a coloring ink to predetermined positions on the surface of the mother substrate 12 according to program software stored in the memory 71 and includes, as specific function realization units, a cleaning calculation unit performing calculation for realizing cleaning processing, a capping calculation unit for realizing capping processing, a weight measurement calculation unit for performing calculation for realizing weight measurements using the electric balance 78 (see FIG. 17), and an imaging calculation unit for performing calculation for imaging a coloring ink by inkjet.

The imaging calculation unit includes various kinds of functional calculation units such as an imaging starting position calculation unit for setting the printer head 22a to an initial position for imaging, a main-scan control calculation unit for calculating control for scan-shifting the printer head 22a at a predetermined speed in the head scanning direction X, a sub-scan control calculation unit for calculating control for shifting the mother substrate 12 in the sub-scanning direction Y at a predetermined sub-scan shift pitch by a sub-scan amount, and a discharge nozzle discharge control calculation unit for carrying out calculation for performing control on which ones of a plurality of discharge nozzles 27 in the inkjet head 22 are activated to discharge a coloring ink.

Furthermore, if part or all of the functions described above can be realized by a single logic circuit or electronic circuit using no CPU, instead of being realized using the CPU 69, such an electronic circuit or the like may be used in place of, or in addition to, the CPU 69.

Operations of inkjet device of FIG. 17 constituted by the above configuration will be described below based on the flowchart shown in FIG. 28.

When inkjet device is activated by turning the power on by an operator, initial setting is first carried out at step S1. Specifically, the head unit 26, the substrate feeder 23, the controller 24 and the like are set to predetermined initial states.

Then, if weight measurement timing is reached (YES at step S2), the head unit 26 shown in FIG. 18 is shifted to the electric balance 78 shown in FIG. 17 by main-scanning driver 19 (step S3), and the amount of ink discharged from discharge nozzles 27 is measured for each of all discharge nozzles 27 using the electronic balance 78 (step S4). A voltage applied to the piezoelectric element 41 corresponding to each discharge nozzle 27 is adjusted according to ink discharge characteristics of discharge nozzles 27 (step S5).

Then, cleaning timing is achieved (YES at step S6), the head unit 26 is shifted to cleaner 77 by main-scan driver 19 (step S7), and the inkjet head 22 is cleaned by the cleaner 77 (step S8).

If weight measurement timing and cleaning timing are not reached (NO at steps S2 and S6), or such processing is completed, the substrate feeder 23 shown in FIG. 17 is activated to feed the mother substrate 12 to the table 49 at step S9. Specifically, the mother substrate 12 in the substrate housing portion 57 is held by sticking the mother substrate 12 under suction by the suction pad 64, and then the vertically moving shaft 61, the first arm 62 and the second arm 63 are shifted to transport the mother substrate 12 to the table 49, and is pressed against a positioning pin 50 (see FIG. 18) provided at an appropriate position on the table 49 in advance. Furthermore, for preventing a positional shift of the mother substrate 12 on the tables 49, the mother substrate 12 is preferably fixed to the table 49 by means such as air suction.

Then, the output shaft of the θ motor 51 shown in FIG. 18 is rotated to very small angles while the mother substrate 12 is observed with the camera for substrate 82 shown in FIG. 17, whereby the table 49 is rotated in plane to very small angles to position the mother substrate 12 (step S10). Then, a position at which the inkjet head 22 starts imaging is determined by calculation while the mother substrate 12 is observed with the camera for head 81 shown in FIG. 8 (step S11), and main-scan driver 19 and sub-scan driver 21 are activated as appropriate to shift the inkjet head 22 to the position at which imaging is started (step S12).

At this time, it is preferable that the printer head 22a be configured so that a plurality of discharge nozzles 27, and hence discharge nozzle rows 28, are slanted at an angle of θ with respect to the sub-scanning direction Y of the printer head 22a as shown in FIG. 16. This is a measure to make the inter-discharge nozzle pitch D geometrically identical to the element pitch in dimensional components of the inter-discharge nozzle pitch D in the sub-scanning direction Y when the printer head 22a is shifted in the head scanning direction X, in view of a situation in which for usual inkjet devices, the inter-discharge nozzle pitch D being a distance between discharge nozzles 27 adjacent to each other is often unequal to the element pitch being a distance between colored portions 6, i.e., areas 5, adjacent to each other.

Figure 28:
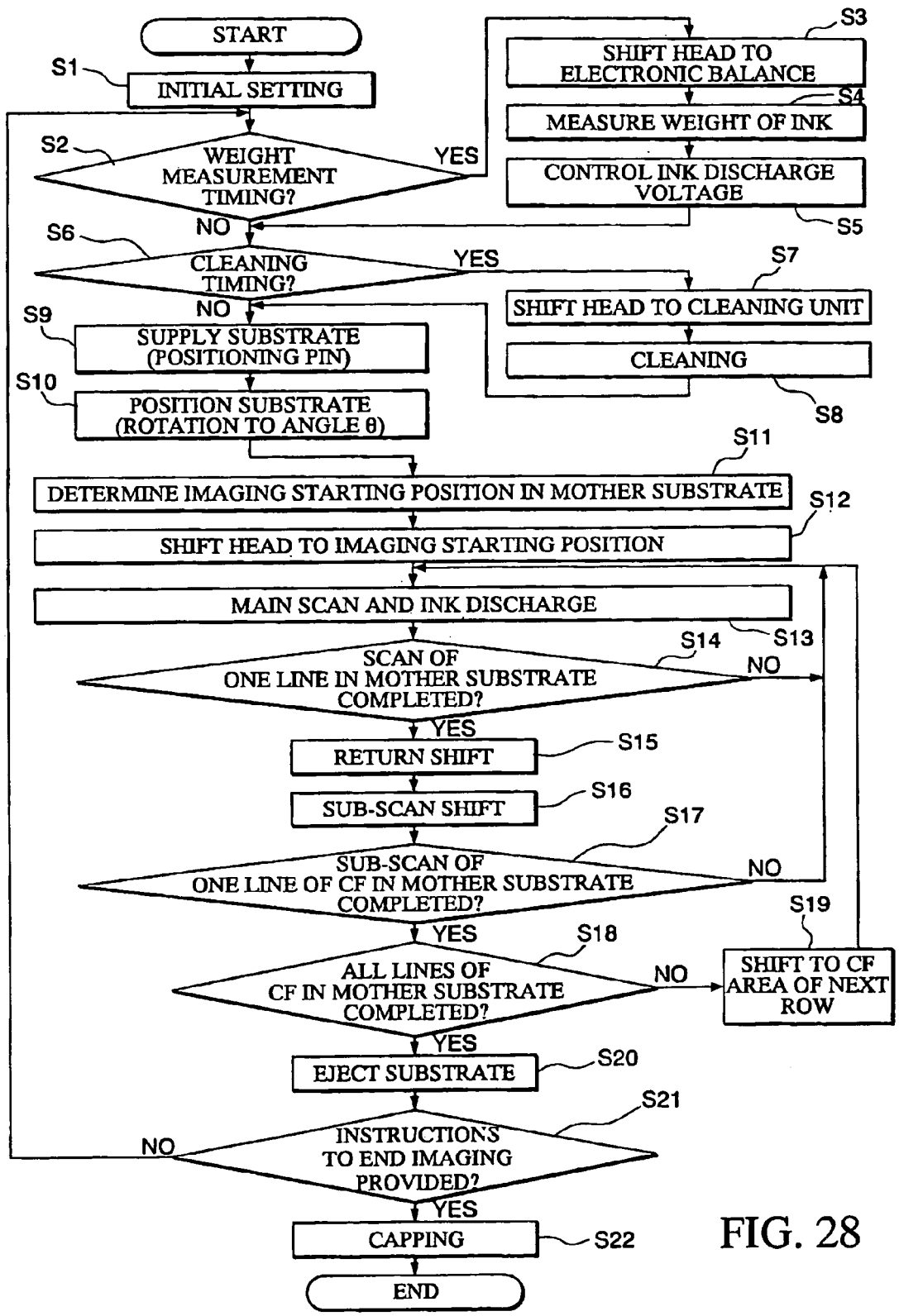
FIG. 28 is a flow chart followed by the control system shown in FIG. 27.

The inkjet head 22 is placed at an imaging starting position at step S12 shown in FIG. 28, then main-scan in the head scanning direction X is started at step S13 shown in FIG. 28, and at the same time, discharge of an ink is started. Specifically, main-scan driver 19 shown in FIG. 18 is activated to make the printer head 22a lineally scan-shift in the head scanning direction X at a fixed speed, and in the meantime, when a discharge nozzle 27 corresponding to an area 5 to be supplied with the ink is reached, the coloring ink is discharged from the discharge nozzle 27.

Furthermore, the ink discharge at this time is not an amount for filling the total volume of the area 5, but an amount equivalent to a fraction of the total volume, specifically, one-quarter of the total volume. This is because, as described later, it is preferable that the total volume of each area 5 be filled by repeatedly discharging the ink from the discharge nozzle 27 several times, for example four times, instead of being filled by discharging the ink only once.

When main-scan equivalent to one line over the mother substrate 12 is completed (YES at step S14), the printer head 22a is reversed to return to an initial state (see FIG. 15A) (step S15). Furthermore, the printer head 22a is driven by sub-scan driver 21 to shift in the sub-scanning direction Y by a predetermined sub-scan shift pitch P (step S16).

The printer head 22a making a sub-scan shift to a position shown in FIG. 15B repeatedly makes a main-scan shift and discharges an ink at step S13. Furthermore, the printer head 22a then repeats a main-scan shift and ink discharge while repeating a sub-scan shift (steps S13 to S16), and consequently, ink deposition processing for one row of color filters 11 in the mother substrate 12 is completed.

Furthermore, in this embodiment, by ink discharge processing performed several times, for example four times, the total volume is entirely filled with a predetermined amount, i.e., a predetermined thickness of coloring ink.

In addition, when discharge nozzle rows 28 make a sub-scan shift one after another, a discharge nozzle row 28 at each position never overlaps a discharge nozzle row 28 at any other position with respect to the sub-scanning direction Y, but discharge nozzle rows 28 between the positions are mutually continuous with respect to the sub-scanning direction Y Thus, the discharged coloring ink has a uniform thickness.

In this way, when ink discharge for one row of color filters 11 in the mother substrate 12 is completed, the inkjet head 22 is driven by sub-scan driver 21 and thereby transported to an initial position of a next row of color filters 11 (step S19), and repeatedly performs main-scan, sub-scan and ink discharge over color filters 11 in the row to form a filter element in the area 5 (steps S13 to S16).

Thereafter, when colored portions 6 of one color, e.g., R color, of R (red), G (green), and B (blue), are formed with respect to all color filters 11 in the mother substrate 12 (YES at steps S17 and S18), the post-processing mother substrate 12 is ejected to the outside by the substrate feeder 23 or other transportation device at step S20.

Thereafter, unless the operator provides instructions to end processing (NO at step S21), processing returns to step S2, where an ink deposition operation as to R color is repeated for another mother substrate 12.

When the operator provides instructions to end processing (YES at step S21), the CPU 69 transports the printer head 22a to capping device 76 in FIG. 17 to subject the printer head 22a to capping processing by the capping device 76 (step S22).

In this way, patterning is completed for a first color, e.g., R color, among three colors of R, G, and B colors constituting the color filter, and the mother substrate 12 is then transported to inkjet device using as a coloring ink a second color, e.g., G color, among R, G, and B colors, to perform patterning with G color, and is finally transported to an inkjet device using as a coloring ink a third color, e.g., B color, among R, G, and B colors, to perform patterning with B color. Consequently, a mother substrate 12 provided with a plurality of color filters 11 having desired dot arrangements of R, G, and B such as stripe arrangements.

Furthermore, if the color filter 11 is used for color display in liquid crystal display apparatus, electrodes, an orientation film and the like are further stacked on the surface of the color filter 11. In this case, if the mother substrate 12 is slit to cut individual color filters 11 therefrom before electrodes, an orientation film and the like are stacked, a subsequent step of forming electrodes and the like becomes very cumbersome. Thus, in this case, it is preferable that the mother substrate 12 be slit after a necessary addition step of forming electrodes, and an orientation film and the like be completed instead of slitting the mother substrate 12 just after color filters 11 are completed on the mother substrate 12.

In this way, each colored portion 6 in the color filter 11 is not formed by just one main-scan in the X direction by the inkjet head 22, but each colored portion 6 is formed in a predetermined thickness by repeatedly discharging an ink to the colored portion 6 n times, e.g., four times, by a plurality of discharge nozzles 27 belonging to different discharge nozzle groups. Thus, even if there are variations in ink discharge among a plurality of nozzles 27, occurrence of variations in thickness among a plurality of colored portions 6 can be prevented, and therefore the light transmission characteristics and light reflection characteristics of the color filters can be made uniform in a plane.

Figure 29:
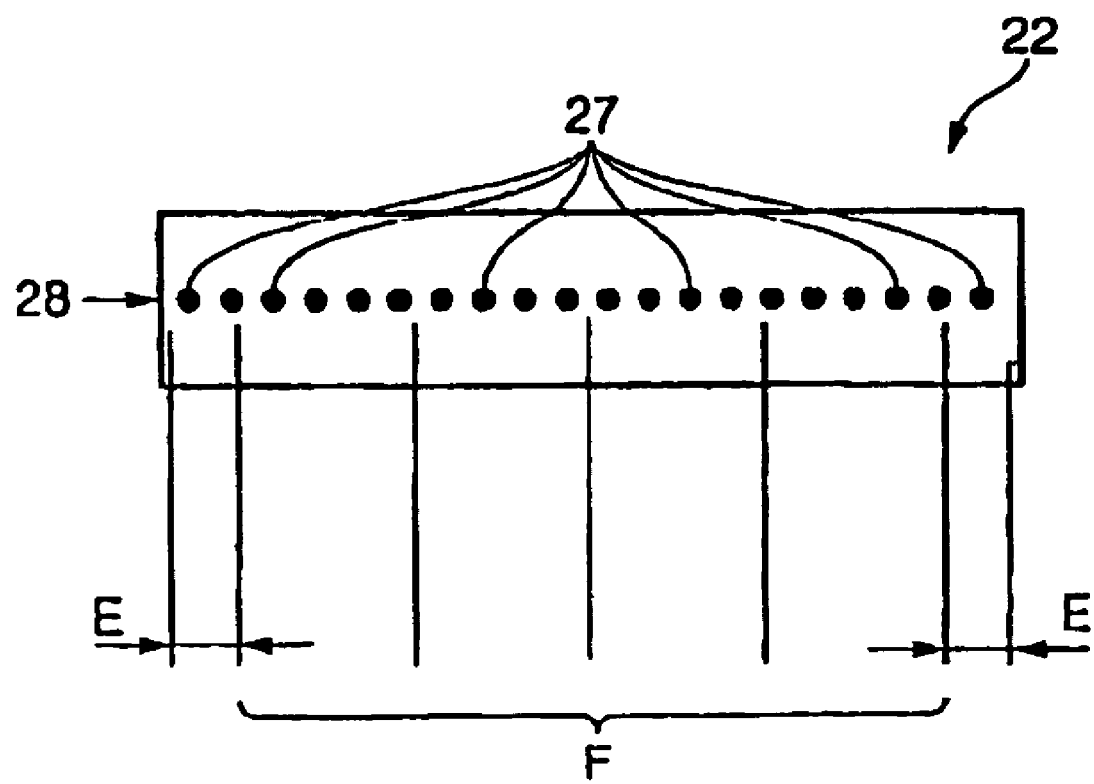
FIG. 29 is an enlarged plan view of the inkjet head for use in the color filter producing apparatus.

In addition, as described previously, to cope with the situation in which he distribution of ink discharges of a plurality of discharge nozzles 27 forming the discharge nozzle row 28 of the inkjet head 22 becomes uneven, and one or more discharge nozzles 27 (e.g., ten discharge nozzles on each end side) existing on both ends of the discharge nozzle row 28 discharge particularly large amounts of ink, it is preferable that one or more discharge nozzles (e.g., about ten discharge nozzles) existing on both ends E of the discharge nozzle row 28, of a plurality of discharge nozzles 27 formed on the inkjet head 22, be previously adjusted to discharge no ink as shown in FIG. 29. If the number of discharge nozzles 27 is 180, for example, conditions may be set up for applied voltages and the like such that 10 discharge nozzles 27 at each end, i.e., a total of 20 discharge nozzles 27, discharge no ink, and inks are discharged using the other 160 discharge nozzles in the middle area.

Sixth Embodiment

A liquid crystal apparatus (display apparatus) of the sixth embodiment of the present invention will now be described with reference to the drawings.

Figure 30:
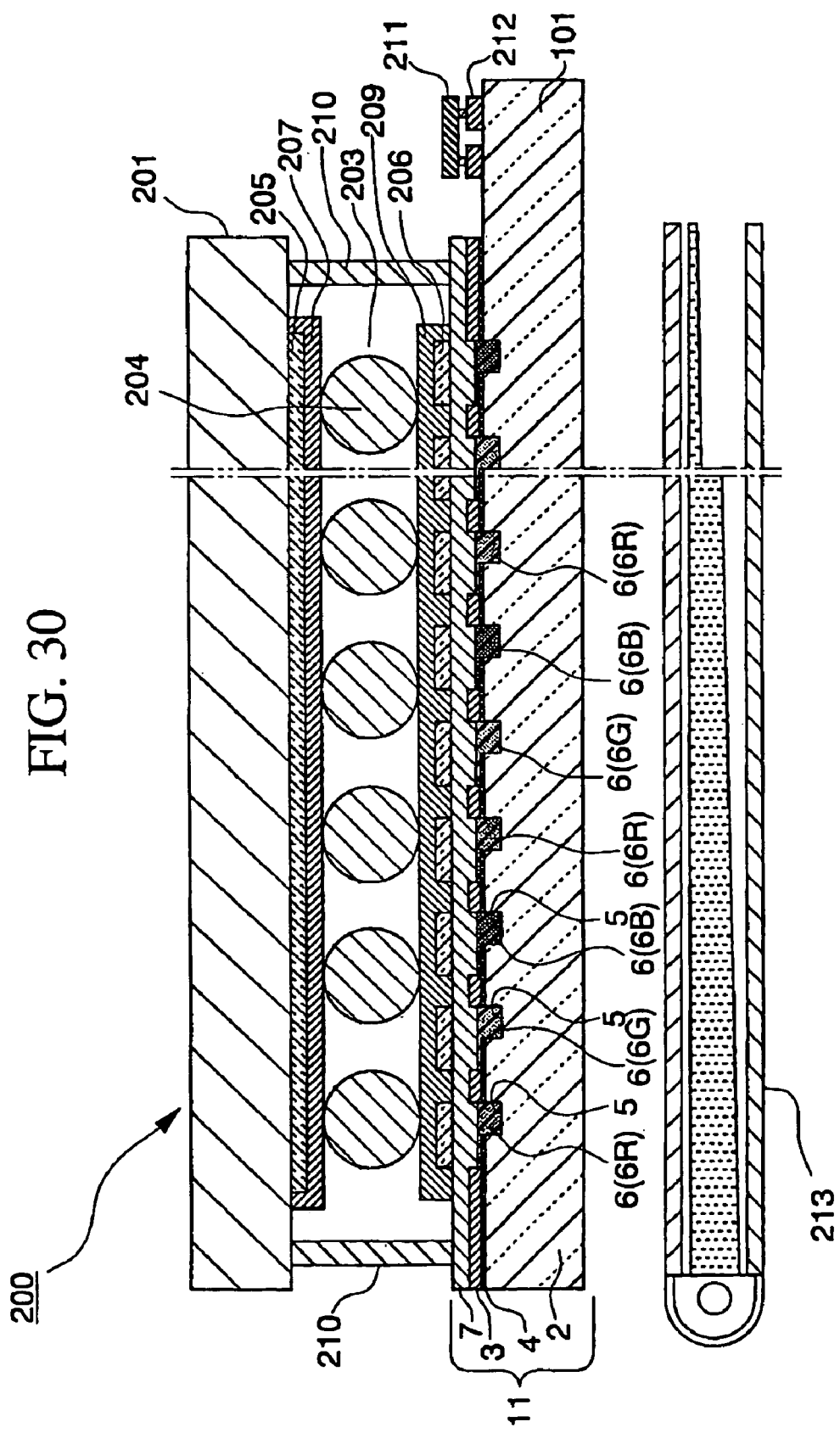
FIG. 30 is a sectional view showing essential parts of a liquid crystal apparatus of the sixth embodiment of the present invention.

FIG. 30 is a sectional view showing an outline configuration of a passive matrix-type liquid crystal apparatus (display apparatus) as the sixth embodiment. A liquid crystal apparatus 200 of this embodiment is equipped with supplemental elements such as a liquid crystal driving IC 211, wirings 212, a light source 213 and a support, whereby a semi-transmitting and reflecting liquid crystal display apparatus is formed as a final product.

This liquid crystal apparatus 200 includes, as a color filter, the color filter 11 described in the first embodiment, in which the color filter 11 is placed on the lower side (opposite to the viewer's side). Furthermore, the color filter 11 will be briefly described in this embodiment.

FIG. 30 shows essential parts of the liquid crystal apparatus 200, and the approximate configuration of this liquid crystal apparatus 200 is such that a liquid crystal layer 203 composed of an STN (Super Twisted Nematic) liquid crystal or the like is held between the color filter 11 and a substrate 201 composed of a glass substrate or the like. A seal material 210 is placed between the periphery of the color filter 11 and the periphery of the substrate 201, and the liquid crystal layer 203 is encapsulated in an area partitioned by the color filter 11, the substrate 201 and the seal material 210.

The color filter 11 is identical to that described in the first embodiment, and includes a substrate 2, banks 3 formed on one surface 2a of the substance, reflection layers 4, colored portions 6, an overcoat layer 7 for covering banks 3 and colored portions 6, and recessed portions 8 formed by etching the substrate 2 in a predetermined pattern. The colored portion 6 is constituted by a colored portion 6R of red (R), a colored portion of green (G), and a colored portion of blue (B).

A plurality of electrodes 206 are formed at predetermined intervals in a stripe form on the overcoat layer 7 (on the liquid crystal layer 203 side) of the color filter 11, and an orientation film 209 is further formed thereon (on the liquid crystal layer 203 side).

Similarly, a plurality of electrodes 205 extending in a direction orthogonal to electrodes 206 on the color filter side are formed at predetermined intervals in a stripe form on the surface in the substrate 201 facing the color filter 11, and the orientation film 207 is formed thereunder. One of the colored portions 6 of the color filter 11 is placed at a position corresponding to a position at which the electrode 205 and the electrode 206 cross each other.

Furthermore, electrodes 205 and 206 are made by forming a transparent conductive material such as ITO (Indium Tin Oxide) in a plain strip form.

In addition, deflecting plates (not shown) are provided on the outer surface sides of the substrate 201 and the color filter 11, respectively. In addition, reference numeral 204 denotes a spacer for keeping a space between substrates (called a cell gap) constant in the substrate surface.

This liquid crystal apparatus 200 includes the color filter 11 described previously, thus making it possible to form a semi-transmitting and reflecting liquid crystal apparatus of high visibility having suitable transmitting and reflecting modes.

In addition, by gauging the recessed portions 8 with the depth thereof being adjusted, the optical path length of the light transmitting area 5 can be set to a desired length, and therefore, display color by source light 910 can be made to have a desired density. Here, because the depth of the recessed portions 8 is defined with respect to the reflection surface of the light reflecting areas 5H so that the light reflecting areas 5H and the light transmitting areas 5T have the same optical path length in the colored portion 6, external light 920 and source light 910 passing through the colored portion 6 have the same optical path length, and thus the densities of display color in transmitting and reflecting modes can be made identical.

In addition, the recessed portions 8 is filled with the colored portion 6, whereby the thickness of the color filter 11 can be reduced, thus making it possible to improve the light transmittance.

In addition, the reflection layer 4 scatteringly reflects external light 920, and thus a display apparatus having a large view angle with respect to a display screen, i.e., a wide view angle liquid crystal apparatus is provided.

Seventh Embodiment

A liquid crystal apparatus (display apparatus) of the seventh embodiment of the present invention will now be described with reference to the drawings.

Figure 31:
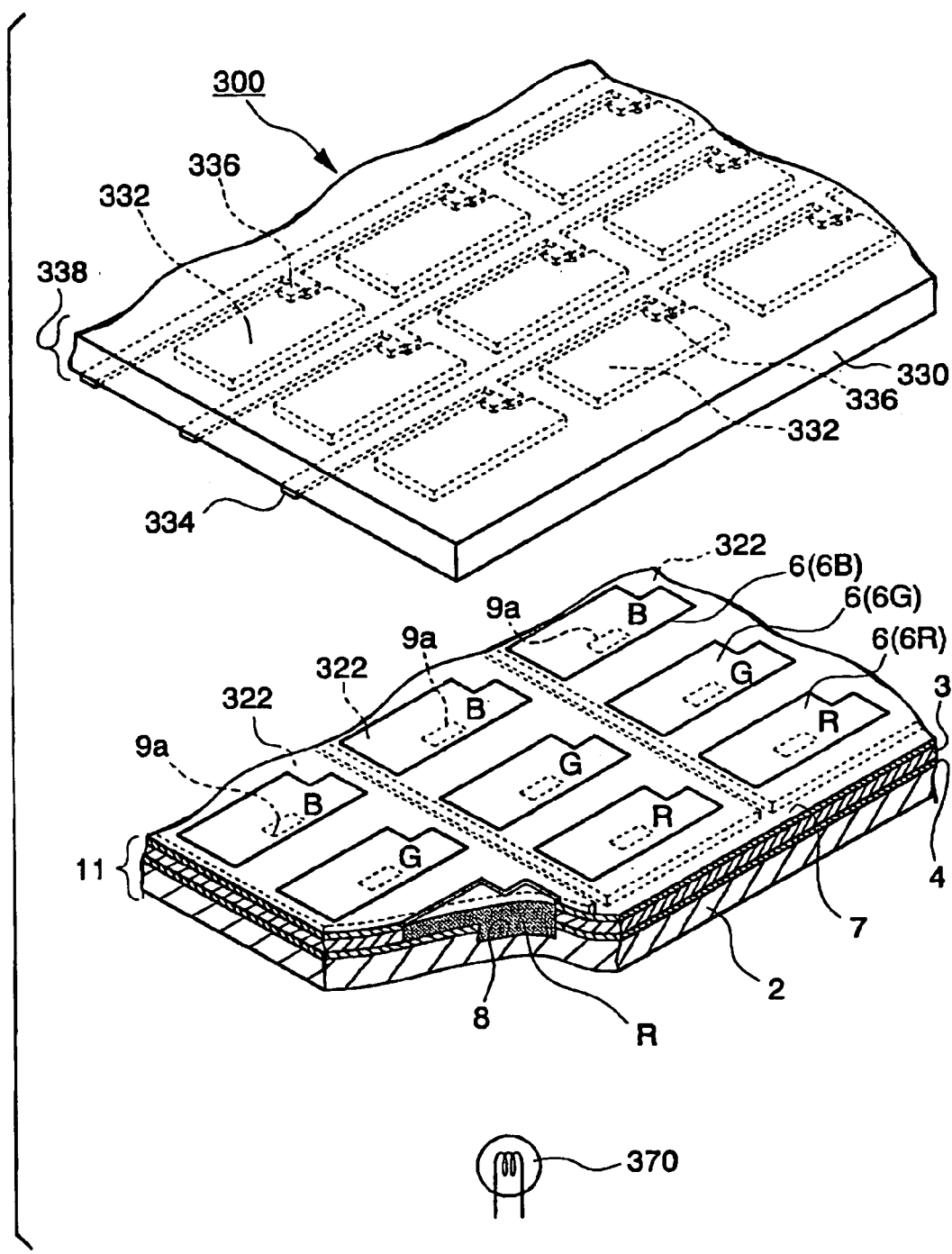
FIG. 31 is a sectional view showing essential parts of the liquid crystal apparatus of the seventh embodiment of the present invention.

FIG. 31 is an exploded perspective view of a liquid crystal apparatus 300 of TFD (Thin Film Diode) type of semi-transmitting and reflecting type as the seventh embodiment of the present invention.

The liquid crystal apparatus 300 of this embodiment is equipped with supplemental elements such as a liquid crystal driving IC and a support, whereby a semi-transmitting and reflecting liquid crystal display apparatus is formed as a final product.

This liquid crystal apparatus 300 includes the color filter 11 described as a color filter in the first embodiment, in which the color filter 11 is placed on the lower side (opposite to the viewer's side). Furthermore, in this embodiment, the color filter 11 will be briefly described.

As shown in FIG. 31, this liquid crystal apparatus 300 is a liquid crystal apparatus of TFD (Thin Film Diode) type of the active matrix type, in which the color filter 11 and a substrate 338 are placed in such a manner as to face each other with a predetermined spacing provided therebetween, and a liquid crystal (not shown) exists between the color filter 11 and the substrate 338.

Furthermore, although not shown in the drawing, a seal material is placed on the peripheral side of substrates 2 and 330, substrates 2 and 330 are unified in such a manner as to face each other, and a liquid crystal is placed between the two substrates 2 and 330.

The substrate 338 is an element substrate, and a plurality of pixel elements 332 constituted by transparent electrodes such as ITO for example, and TFD elements 336 for controlling pixel electrodes 332 are provided in a matrix form on the lower surface of the transparent substrate 330 made of glass or the like. The TFD element 336 is placed at one corner of the pixel electrode 332. In addition, the TFD element 336 is connected to a scan line 334, and the liquid crystal can be switched to a display, non-display or intermediate state based on a manipulated signal and a signal applied to a data line (opposed electrode) 322 described later.

As shown in FIG. 31, the color filter 11 includes the substrate 2, banks 3 formed on one surface of the substrate 2 (in other words, a surface on the liquid crystal layer side), reflection layers 4, colored portions 6, an overcoat layer 7 covering banks 3 and colored portions 6, and recessed portions 8 formed by etching the substrate 2 in a predetermined pattern. On the overcoat layer 7 are formed strip electrodes (opposed electrodes) 322 made of ITO and constituting a data line.

Colored portions 6 are formed in a matrix form at positions facing pixel electrodes 332 of the substrate 338, and are constituted by blue colored portions (denoted by "B" in the figure) 6B, green colored portions (denoted by "G" in the figure) 6G and red colored portions (denoted by "R" in the figure) 6R. Colored portions 6 are placed at some distance from one another, and banks 3 are formed between colored portions 6 in correspondence with non-image display areas (area on the other substrate 338 with no pixel electrode 332 formed thereon).

This liquid crystal apparatus 300 can provide an effect equivalent to that of the liquid crystal apparatus 200 of the sixth embodiment.

Eighth Embodiment

A liquid crystal apparatus (display apparatus) of the eighth embodiment of the present invention will now be described with reference to the drawings.

Figure 32:
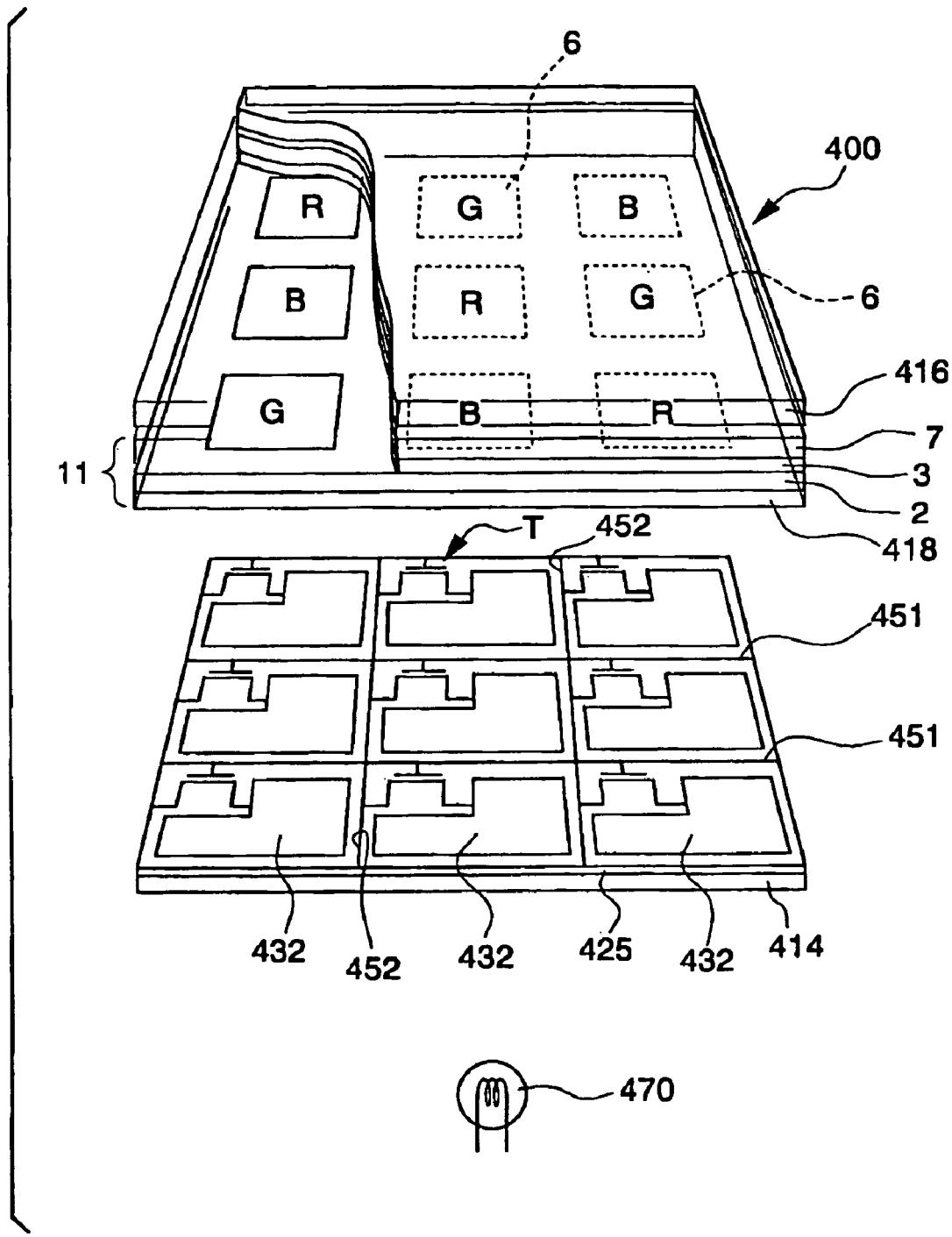
FIG. 32 is a sectional view showing essential parts of the liquid crystal apparatus of the eighth embodiment of the present invention.

FIG. 32 is an exploded perspective view of a liquid crystal apparatus 400 of transparent TFT (Thin Film Transistor) type as the eighth embodiment of the present invention.

The liquid crystal apparatus 400 of this embodiment is equipped with supplemental elements such as a liquid crystal driving IC and a support, whereby a semi-transmitting and reflecting liquid crystal display apparatus is formed as a final product.

This liquid crystal apparatus 400 includes the color filter 11 described in the first embodiment, in which the color filter 11 is placed on the upper side (viewer's side). Furthermore, in this embodiment, the color filter 11 will be briefly described.

The liquid crystal apparatus 400 of this embodiment includes mainly the color filter 11 and a glass substrate 414 placed in such a manner as to face each other, a liquid crystal layer (not shown) held therebetween, a deflecting plate 416 provided on the upper side (viewer's side) of the color filter 11, and a deflecting plate (not shown) provided on the lower side of the glass substrate 414. In addition, source light 910 from a light source 470 placed outside the glass substrate 414 passes to the glass substrate 414 side.

The color filter 11 is a front-side substrate provided in such a manner as to face the viewer's side, and includes a substrate 2, banks 3 formed on the upper surface (in other words, a surface on the liquid crystal layer side) of the substrate 2, reflection layers 4, colored portions 6, and an overcoat layer 7 covering banks 3 and colored portions 6, and recessed portions 8 formed by etching the substrate 2 in a predetermined pattern as shown in FIG. 32.

Furthermore, a driving electrode 418 is formed on the lower side (liquid crystal layer side) of the overcoat layer 7, and the electrode 418 has a transparent conductive material such as ITO (Indium Tin Oxide) formed on the entire surface of the overcoat layer 7.

The glass substrate 414 is a transparent substrate provided on the opposite side, in other words the back side.

Furthermore, an actual liquid crystal apparatus is provided on the liquid crystal layer side an orientation film to cover the electrode 418, but this is not shown in FIG. 32, and an orientation film is also provided on an electrode 432 described later on the opposite glass plate 414 side, but this is not shown in FIG. 32, and description of the orientation film is not given.

In addition, an insulation layer 425 is formed on the glass substrate 414, and a thin film transistor T as a switching element of TFT type and a pixel electrode 432 are formed on the insulation layer 425.

Scan lines 451 and signal lines 452 are formed in a matrix form on the insulation layer 425 formed on the glass substrate 414, the pixel electrode 432 is provided for each area surrounded by the scan line 451 and the signal line 452, and a thin transistor T is incorporated in an area between the corner part of each pixel electrode 432 and the scan line 451 and the signal line 452 so that the thin transistor T can be turned on and off by application of a signal to the scan line 451 and the signal line 452 to control the passage of a current through the pixel electrode 432. In addition, the electrode 418 formed on the opposite color filter 11 side is a whole area electrode covering the entire pixel electrode formation area in this embodiment. Furthermore, there are a variety of wiring circuits of TFT and pixel electrode forms, and in this embodiment, those shown in FIG. 32 are illustrated, but this embodiment can be applied to liquid crystal apparatuses having other forms of TFT as a matter of course.

This liquid crystal apparatus 400 can provide an effect equivalent to that of the liquid crystal apparatus 200 of the sixth embodiment and the liquid crystal apparatus 300 of the seventh embodiment.

Ninth Embodiment

Specific examples of electronic device including any of liquid crystal apparatuses 200, 300, and 400 of the sixth, seventh, and eighth embodiments will now be described.

Figure 33A:
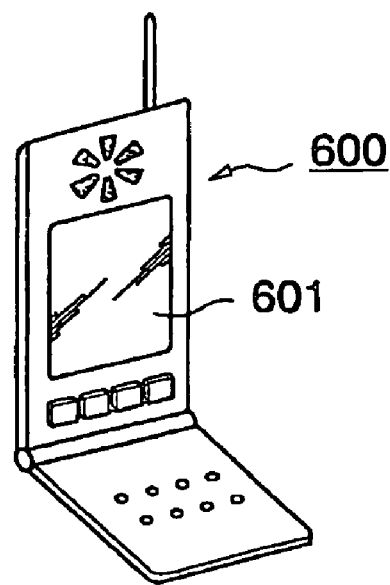
FIGS. 33A through 33C are perspective views showing an electric device of the ninth embodiment of the present invention.

FIG. 33A is a perspective view showing one example of a cellular phone. In FIG. 33A, reference numeral 600 denotes a cellular phone main body, and reference numeral 601 denotes a liquid crystal display unit using any of the liquid crystal apparatuses 200, 300, and 400.

Figure 33B:
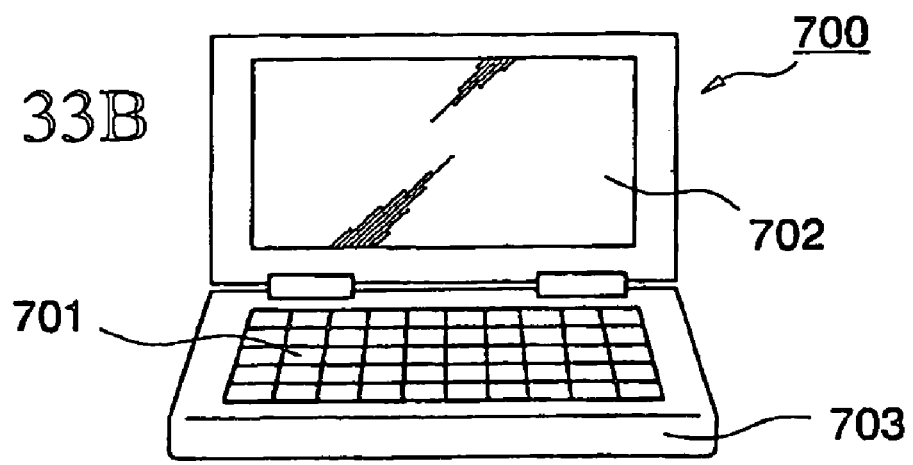

FIG. 33B is a perspective view showing one example of a portable information processor such as a word processor or personal computer. In FIG. 33B, reference numeral 700 denotes an information processor, reference numeral 701 denotes an input unit such as a keyboard, reference numeral 703 denotes an information processor main body, and reference numeral 702 denotes a liquid crystal display unit using any of the liquid crystal apparatuses 200, 300, and 400.

Figure 33C:
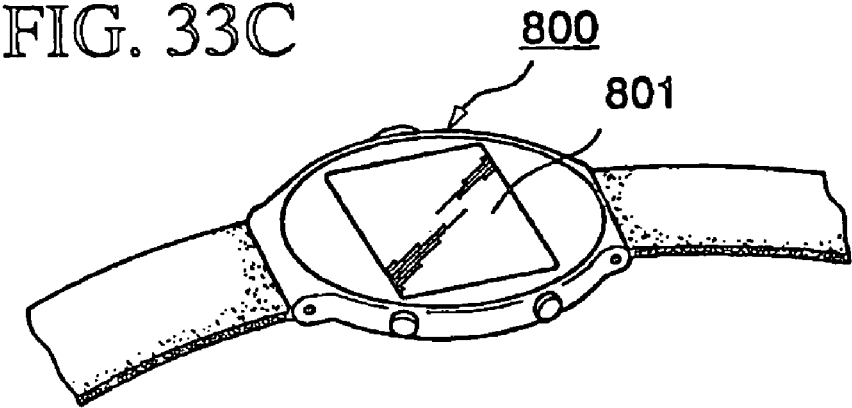
Figure 34:
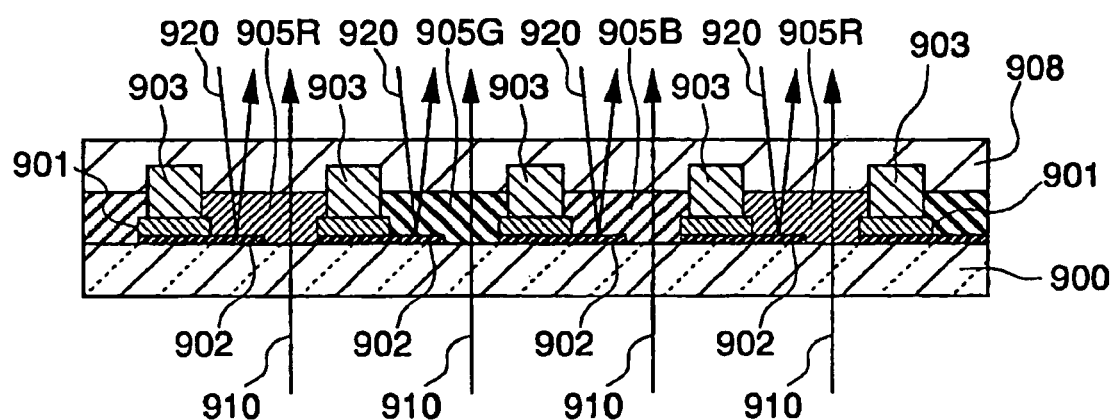
FIG. 34 is a sectional view of the conventional color filter.

FIG. 33C is a perspective view showing one example of a wristwatch-type electronic device. In FIG. 33C, reference numeral 800 denotes a watch main body, and reference numeral 801 denotes a liquid crystal display unit using any of the liquid crystal apparatuses 200, 300, and 400.

Electronic devices shown in FIGS. 33A to 33C include a liquid crystal display unit using any of the liquid crystal apparatuses 200, 300 and 400, and has characteristics of liquid apparatuses 200, 300, and 400 of the sixth to eighth embodiments, and electronic device of high visibility having suitable transmitting and reflecting modes are obtained using any of the liquid crystal apparatuses.

What is claimed is:

1. A color filter comprising a substrate having a plurality of areas, each area having a colored portion thereon,
    wherein said plurality of areas each have a light reflecting area comprising a reflection layer in which light entering said colored portion is reflected, and a light transmitting area through which light entering said colored portion passes,
    wherein said light transmitting area includes a recessed portion for adjusting an optical path length in said colored portion, and
    wherein said plurality of areas are partitioned by banks formed on the substrate.

2. The color filter according to the claim 1, wherein the depth of said recessed portion is defined with respect to the reflection surface of said light reflecting area so that said light reflecting are and said light reflecting area so that said light transmitting area and said light transmitting area have the same optical path length in said colored portion.

3. The color filter according to the claim 1, wherein a ratio between the plane area of said light reflecting area and the plane area of said light transmitting area is set so that the ratio between the light amounts of emitted light from said light reflecting area and emitted light from said light transmitting area is a desired ratio.

4. The color filter according to the claim 1, wherein the surface of said bank are liquid repellent.

5. The color filter according to the claim 1, wherein said colored portion is formed by a droplet discharge process.

6. The color filter according to the claim 1, wherein the reflection surface of said light reflecting area has a light scattering capability.

7. A display apparatus having a color filter on the side of one substrate, of a pair of substrates holding a liquid therebetween and facing each other,
wherein the display apparatus has the color filter of claim 1.

8. Electronic device comprising the display apparatus of claim 7.

9. A method for producing a color filter comprising a substrate having a plurality of areas, each area having a colored portion thereon, said plurality of areas each having a light reflecting area in which light entering said colored portion is reflected and a light transmitting area through which light entering said colored portion passes, the method comprising the steps of:
forming a reflection layer on the substrate;
forming recessed portions in the light transmitting area on the substrate, and
forming banks on the reflection layer, which partition said plurality of areas.

10. The method according to claim 9, wherein,
in the step of forming the recessed portions, each of said recessed portions is formed so that a depth of said recessed portion with respect to the reflection surface of said light reflecting area is the depth at which said light reflecting area and said light transmitting area have the same optical path length in said colored portion.

11. The method according to claim 9, wherein,
in the step of forming the recessed portions, said light reflecting area and said light transmitting area are formed so that a ratio between the plane area of said light reflecting area and the plane area of said light transmitting area results in a desired ratio between a light amount of emitted light from said light reflecting area and a light amount of emitted light from said light transmitting area.

12. The method according to claim 9, wherein said recessed portion and said light reflecting area are formed in one operation by an etching method.

13. The method according to claim 9, wherein said colored portion is formed by a droplet discharge process.

* * * * *

UNITED STATES PATENT AND TRADEMARK OFFICE
CERTIFICATE OF CORRECTION

PATENT NO.        : 7,029,807 B2  
APPLICATION NO.   : 10/717999  
DATED             : April 18, 2006  
INVENTOR(S)       : Kazuaki Sakurada and Tomomi Kawase Page 1 of 1

It is certified that error appears in the above-identified patent and that said Letters Patent is hereby corrected as shown below:

Title Page, Item (57), Abstract:
  Line 3:                    "areas" should be --area--.  
  Line 5:                    "areas" should be --area--.  
  Line 7:                    "portions" should be --portion--.

Column 1, Line 18:        "device" should be --devices--.

Column 4, Line 45:        "refection" should be --reflection--.

Column 6, Line 27:        "refection" should be --reflection--.

Column 8, Line 37:        After "2", insert --are--.

Column 8, Line 51:        "areas" should be --area--.

Column 8, Line 54:        "areas" should read --area--.

Column 9, Line 17:        "portions" should be --portion--.

Column 12, Line 52:       "potion" should be --portion--.

Signed and Sealed this

Second Day of January, 2007

JON W. DUDAS  
*Director of the United States Patent and Trademark Office*

UNITED STATES PATENT AND TRADEMARK OFFICE
CERTIFICATE OF CORRECTION

PATENT NO. : 7,029,807 B2
APPLICATION NO. : 10/717999
DATED : April 18, 2006
INVENTOR(S) : Kazuaki Sakurada and Tomomi Kawase It is certified that error appears in the above-identified patent and that said Letters Patent is hereby corrected as shown below:

Title Page, Item (57), Abstract:
  Line 3:                      "areas" should be --area--.
  Line 5:                      "areas" should be --area--.
  Line 7:                      "portions" should be --portion--.

Column 1, Line 18:         "device" should be --devices--.

Column 4, Line 45:         "refection" should be --reflection--.

Column 6, Line 27:         "refection" should be --reflection--.

Column 8, Line 37:         After "2", insert --are--.

Column 8, Line 51:         "areas" should be --area--.

Column 8, Line 54:         "areas" should read --area--.

Column 9, Line 17:         "portions" should be --portion--.

Column 12, Line 52:         "potion" should be --portion--.

Column 13, Line 16:         "though" should be --through--.

Column 13, Line 63:         "areas" should be --area--.

Column 14, Line 32:         Delete second occurrence of "of the present invention".

Column 16, Line 8:         "sthree" should be --three--.

Column 18, Line 4:         "75 m$\mu$" should be --*75 $\mu m$*--.

Column 19, Line 2:         "1/" should be --1/2--.

Column 19, Line 9:         "colored" should be --color--.

Column 19, Line 45:         After "32.", "the" should be --The--.

Column 20, Line 17:         "a" should be --$\alpha$--.

UNITED STATES PATENT AND TRADEMARK OFFICE
CERTIFICATE OF CORRECTION

PATENT NO. : 7,029,807 B2
APPLICATION NO. : 10/717999
DATED : April 18, 2006
INVENTOR(S) : Kazuaki Sakurada and Tomomi Kawase It is certified that error appears in the above-identified patent and that said Letters Patent is hereby corrected as shown below:

| | |
|---|---|
| Column 20, Line 27: | "0" should be --$\theta$--. |
| Column 21, Line 32: | "read" should be --Read--. |
| Column 22, Line 1: | "ones" should be --one--. |
| Column 23, Line 8: | "lineally" should be --linearly--. |
| Column 24, Line 37: | "he" should be --the--. |
| Column 27, Line 43: | After "side", insert --of--. |
| Column 28, Line 55: | "are" should be --area--. |
| Column 28, Line 55: | After "and", delete "said light reflecting area so that". |
| Column 28, Line 56: | After "area", delete "and said light transmitting area". |
| Column 28, Line 65: | "surface" should be --surfaces--. |
| Column 28, Line 65: | "bank" should be --banks--. |

This certificate supersedes the Certificate of Correction issued January 2, 2007.

Signed and Sealed this

First Day of September, 2009

David J. Kappos
*Director of the United States Patent and Trademark Office*